US011356938B2

(12) United States Patent
Ogawa et al.

(10) Patent No.: US 11,356,938 B2
(45) Date of Patent: Jun. 7, 2022

(54) CONTROL METHOD FOR A DEVICE THAT INCLUDES A LONG-DISTANCE COMMUNICATION MODULE AND A SHORT-DISTANCE COMMUNICATION MODULE, THE DEVICE, AND A SYSTEM INCLUDING THE DEVICE

(71) Applicant: PANASONIC INTELLECTUAL PROPERTY MANAGEMENT CO., LTD., Osaka (JP)

(72) Inventors: Tomoki Ogawa, Osaka (JP); Mitsuki Yamada, Osaka (JP); Masayuki Kozuka, Osaka (JP); Kunio Gobara, Osaka (JP); Yoshishige Yoshikawa, Osaka (JP); Shinya Nakai, Nara (JP); Junya Suzuki, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/638,721

(22) PCT Filed: Feb. 27, 2019

(86) PCT No.: PCT/JP2019/007575
§ 371 (c)(1),
(2) Date: Feb. 12, 2020

(87) PCT Pub. No.: WO2019/172044
PCT Pub. Date: Sep. 12, 2019

(65) Prior Publication Data
US 2020/0374147 A1  Nov. 26, 2020

Related U.S. Application Data

(60) Provisional application No. 62/640,758, filed on Mar. 9, 2018.

(51) Int. Cl.
*H04W 48/18* (2009.01)
*H04W 4/70* (2018.01)
(Continued)

(52) U.S. Cl.
CPC ............ *H04W 48/18* (2013.01); *H04B 17/23* (2015.01); *H04L 12/282* (2013.01); *H04W 4/70* (2018.02);
(Continued)

(58) Field of Classification Search
CPC ....... H04W 48/18; H04W 4/70; H04W 76/10; H04W 48/16; H04W 88/06; H04L 12/282;
(Continued)

(56) References Cited

U.S. PATENT DOCUMENTS 6,035,183 A   3/2000 Todd et al.
7,245,913 B1  7/2007 Nguyen et al.
(Continued)

FOREIGN PATENT DOCUMENTS

JP   2006-005772 A   1/2006
JP   2006-074295 A   3/2006
(Continued)

OTHER PUBLICATIONS

Final Office Action issued in U.S. Appl. No. 16/638,723, dated Sep. 28, 2020.
(Continued)

*Primary Examiner* — Kristie D Shingles
(74) *Attorney, Agent, or Firm* — McDermott Will & Emery LLP

(57) ABSTRACT

A control method for controlling a device that includes a plurality of communication modules including a long-distance communication module that is a communication module for long-distance wireless communication and a short-
(Continued)

distance communication module that is a communication module for short-distance wireless communication, the device being capable of being connected through each of the plurality of communication modules to a server that manages the device, the control method includes: receiving information necessary to the short-distance wireless communication by the short-distance communication module, when the long-distance communication module and the short-distance communication module are not operating; determining whether the information satisfies a condition indicating that the information received in the receiving is sufficient for a first connection to the server using the short-distance communication module; and causing the long-distance communication module to start operating, when it is determined that the information does not satisfy the condition.

9 Claims, 26 Drawing Sheets

(51) Int. Cl.
| | | |
|---|---|---|
| *H04B 17/23* | (2015.01) | |
| *H04W 76/10* | (2018.01) | |
| *H04W 48/16* | (2009.01) | |
| *H04W 88/06* | (2009.01) | |
| *H04L 12/28* | (2006.01) | |

(52) U.S. Cl.
CPC ........... *H04W 48/16* (2013.01); *H04W 76/10* (2018.02); *H04W 88/06* (2013.01); *H04L 2012/285* (2013.01); *H04L 2012/2841* (2013.01)

(58) Field of Classification Search
CPC ...... H04L 2012/2841; H04L 2012/285; H04B 17/23
See application file for complete search history.

(56) References Cited

U.S. PATENT DOCUMENTS

| | | | |
|---|---|---|---|
| 7,450,958 B2 | 11/2008 | Shim et al. | |
| 7,606,543 B1 | 10/2009 | Seppanen | |
| 7,660,565 B2 | 2/2010 | Patel et al. | |
| 7,756,485 B2 | 7/2010 | Paas et al. | |
| 9,100,939 B2* | 8/2015 | Mukai ................. | H04W 40/244 |
| 2004/0114553 A1 | 6/2004 | Jiang et al. | |
| 2004/0192290 A1 | 9/2004 | Muthuswamy et al. | |
| 2005/0130661 A1 | 6/2005 | Aerrabotu et al. | |
| 2005/0152304 A1 | 7/2005 | Park | |
| 2005/0226178 A1 | 10/2005 | Forand et al. | |
| 2005/0282541 A1 | 12/2005 | Iizuka et al. | |
| 2006/0121894 A1 | 6/2006 | Ganesan | |
| 2007/0010241 A1 | 1/2007 | Wachter et al. | |
| 2007/0016861 A1 | 1/2007 | Salomaa et al. | |
| 2007/0021126 A1 | 1/2007 | Nanda et al. | |
| 2008/0009324 A1 | 1/2008 | Patel | |
| 2009/0111526 A1 | 4/2009 | Masri | |
| 2009/0170554 A1 | 7/2009 | Want et al. | |
| 2010/0027525 A1 | 2/2010 | Zhu | |
| 2010/0083121 A1 | 4/2010 | Famolari et al. | |
| 2010/0099405 A1 | 4/2010 | Brisebois et al. | |
| 2012/0108225 A1* | 5/2012 | Luna ................. | H04W 28/0215 455/418 |
| 2012/0131184 A1* | 5/2012 | Luna ..................... | H04W 28/14 709/224 |
| 2013/0325326 A1 | 12/2013 | Blumenberg et al. | |
| 2014/0171065 A1 | 6/2014 | Graessley | |
| 2014/0200050 A1 | 7/2014 | Tomek et al. | |
| 2015/0009532 A1* | 1/2015 | Tsugimura ............ | G06F 3/1203 358/1.15 |
| 2015/0016406 A1 | 1/2015 | Holostov et al. | |
| 2015/0023161 A1* | 1/2015 | Alisawi ............... | H04L 67/2833 370/230 |
| 2016/0360461 A1 | 12/2016 | Travostino et al. | |
| 2017/0078922 A1* | 3/2017 | Raleigh ................. | H04W 28/10 |
| 2017/0123390 A1 | 5/2017 | Barco et al. | |
| 2019/0268836 A1* | 8/2019 | Tanaka .................. | H04W 48/18 |
| 2020/0187107 A1 | 6/2020 | Ogawa et al. | |

FOREIGN PATENT DOCUMENTS

| | | |
|---|---|---|
| JP | 2013-229915 A | 11/2013 |
| JP | 2016-063520 A | 4/2016 |
| JP | 2016-184817 A | 10/2016 |

OTHER PUBLICATIONS

Non-Final Office Action issued in U.S. Appl. No. 16/638,723, dated Jun. 24, 2020.
International Search Report and Written Opinion dated Apr. 2, 2019 in International Application No. PCT/JP2019/007577; with partial English translation.
International Search Report and Written Opinion dated Apr. 23, 2019 in International Application No. PCT/JP2019/007575; with partial English translation.
Extended European Search Report issued in European Patent Application No. 19764137.6, dated Mar. 12, 2021.
Extended European Search Report issued in European Patent Application No. 19764400.8 dated Mar. 16, 2021.
Xia, N. et al. "Radio Resource Management in Machine-to-Machine Communications—A Survey," IEEE Communications Surveys &Turorials, Oct. 23, 2018, vol. 20, No. 1, First Quarter 2018, pp. 791-828; XP011678442.
Anonymous, "Airplane Mode Wi-Fi Enabler: XDA Developers Forums," Sep. 20, 2009, XP055781491; 6 pages; available at URL:https://forum.xda-developers.com/t/airplane-mode-wi-fi-enabler.549613/.
Non-Final Office Action issued in U.S. Appl. No. 16/638,723, dated Feb. 19, 2021.
Notice of Allowance issued in U.S. Appl. No. 16/638,723, dated Jun. 2, 2021.

* cited by examiner

FIG. 6
CONNECTION RATE OF APPLIANCES
WITH BUILT-IN NETWORK FUNCTION
(JAPANESE MARKET, 2017)
| AUDIOVISUAL APPLIANCES | HOUSEHOLD APPLIANCES |
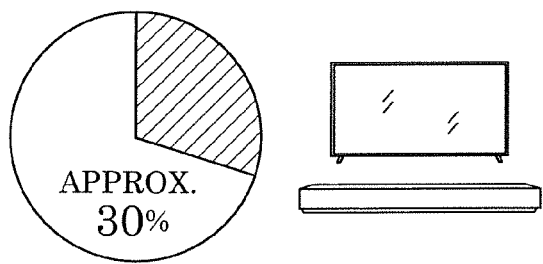
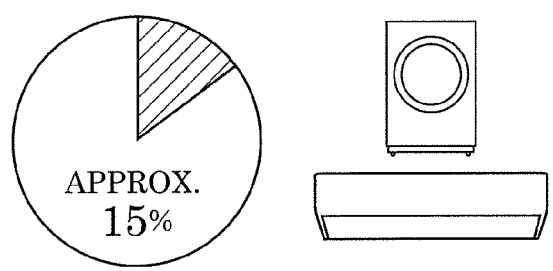

FIG. 8

|  | Wi-Fi | LoRa | NB-IoT | CAT.M1 |
|---|---|---|---|---|
| TYPE | NOT GUARANTEED TO BE ALWAYS CONNECTED | ALWAYS CONNECTED THROUGH NON-CELLULAR NETWORK | ALWAYS CONNECTED THROUGH CELLULAR NETWORK | ALWAYS CONNECTED THROUGH CELLULAR NETWORK |
| RADIO LICENSING | NOT REQUIRED (USES LICENSE-FREE BAND) | NOT REQUIRED (USES LICENSE-FREE BAND) | REQUIRED (CARRIER EXCLUSIVE) | REQUIRED (CARRIER EXCLUSIVE) |
| BASE STATION OPERATION | HOME GW PLACED BY CUSTOMER | MOBILE CARRIER/ SELF-OPERATED | MOBILE CARRIER | MOBILE CARRIER |
| RADIO USAGE FEE | NOT REQUIRED | NOT REQUIRED | REQUIRED | REQUIRED |
| DEVICE COMMUNICATION FEE | PER-HOUSEHOLD LUMP SUM | LOW | APPROX. 20 TIMES HIGHER THAN LoRa | APPROX. 50 TIMES HIGHER THAN LoRa |
| COMMUNICATION STABILITY | UNSTABLE | UNSTABLE | GUARANTEED TO AN EXTENT BY CARRIER | GUARANTEED TO AN EXTENT BY CARRIER |
| COMMUNICATION SPEED | VERY FAST | SLOW | SLOW | MEDIUM TO FAST |
| COMMUNICATION DATA VOLUME | EXCEEDINGLY HIGH | LOW | LOW | RATHER HIGH |
| COMMUNICATION DISTANCE | INSIDE HOME | APPROX. 1–20 km | APPROX. 1–20 km | APPROX. 1–10 km |
| NETWORK CONGESTION TOLERANCE | LOW | LOW | HIGH | HIGH |
| EVALUATION | COMMUNICATION COSTS PAID BY CUSTOMER. COMMUNICATION CHANNEL IS FAST AND BROAD, BUT UNSTABLE. RISK OF NOT BEING ABLE TO CONNECT. | COSTS ARE EXCEEDINGLY LOW. HOWEVER, COMMUNICATION CHANNEL IS SLOW AND NARROW. | HAS OPERATION COSTS. COMMUNICATION CHANNEL IS SLOW, BUT STABLE. | OPERATION COSTS ARE HIGH. STABLE COMMUNICATION CHANNEL WITH ADEQUATE SPEED AND DATA VOLUME. |

| PERIOD OF TIME | | TOTAL NUMBER OF SIMS |
|---|---|---|
| SAT & SUN | 0:00–9:00 | 200 |
| | 9:00–12:00 | 500 |
| | 17:00–24:00 | 300 |
| MON–FRI | 0:00–6:00 | 100 |
| | 6:00–8:00 | 800 |
| | 18:00–20:00 | 800 |
| | OTHER | 500 |

CONTROL METHOD FOR A DEVICE THAT INCLUDES A LONG-DISTANCE COMMUNICATION MODULE AND A SHORT-DISTANCE COMMUNICATION MODULE, THE DEVICE, AND A SYSTEM INCLUDING THE DEVICE

CROSS-REFERENCE OF RELATED APPLICATIONS

This application is the U.S. National Phase under 35 U.S.C. § 371 of International Patent Application No. PCT/JP2019/007575, filed on Feb. 27, 2019, which in turn claims the benefit of U.S. Provisional Application No. 62/640,758, filed on Mar. 9, 2018, the entire disclosures of which Applications are incorporated by reference herein.

TECHNICAL FIELD

The present disclosure relates to a control method, a device, and a system.

BACKGROUND ART

In recent years, there is a configuration in which a household appliance (also referred to as a device) is connected via a network to an appliance control cloud (also referred to as control cloud) that is a cloud for controlling the device, and operates under control of the control cloud (see Patent Literature (PTL) 1).

CITATION LIST

Patent Literature

PTL 1: Japanese Unexamined Patent Application Publication No. 2016-63520

SUMMARY OF THE INVENTION

Technical Problem

However, a user using the device does not necessarily always configure the device and the like for connecting to the network and connect the device to the control cloud. When the device is not connected to the control cloud, there is a problem of control of the device by the control cloud not being implemented.

As such, the present disclosure provides a control method for controlling a device that is capable of being connected to a control cloud and controlled accordingly.

Solutions to Problem

A control method according to the present disclosure for controlling a device that includes a plurality of communication modules including a long-distance communication module that is a communication module for long-distance wireless communication and a short-distance communication module that is a communication module for short-distance wireless communication, the device being capable of being connected through each of the plurality of communication modules to a server that manages the device, the control method includes: receiving information necessary to the short-distance wireless communication by the short-distance communication module, when the long-distance communication module and the short-distance communication module are not operating; determining whether the information received in the receiving satisfies a condition indicating that the information received in the receiving is sufficient for a first connection to the server using the short-distance communication module; and causing the long-distance communication module to start operating, when it is determined in the determining that the information does not satisfy the condition.

With this, the device is in a state in which it is possible to cause the long-distance communication module to operate and communicate with the server, when the device is not provided by a user with the information necessary to the short-distance wireless communication. As such, the device not being connected to either the short-distance wireless communication and the long-distance wireless communication network is avoided, when a short-distance wireless communication connection is not established due to the device not being provided by the user with the information necessary to the short-distance wireless communication. As such, the device is capable of being connected to a control cloud and controlled accordingly.

The control method may further include displaying an image on a display screen that prompts the user to use any of the plurality of communication modules as one communication module used for a connection between the device and the server, when a predetermined period has passed since causing the long-distance communication module to operate in the causing.

This enables the device to prompt the user, through the image, to use the plurality of communication modules included in the device, after the long-distance communication module is caused to operate. It is possible that the user continues using the long-distance communication module only because the long-distance communication module has started operating, but there may be a communication module more suitable for using the device, regardless of whether the long-distance communication module is suitable for using the device. As such, by displaying the above image, it is possible to use a more suitable communication module for connecting to the server, to connect the device to the control cloud, and control the device accordingly.

In the causing, the one communication module may further be caused to start operating or continue operating, upon receiving an instruction from the user after the displaying to use the one communication module.

This enables the device to use the plurality of communication modules included in the device and connect to the server, after the long-distance communication module has been caused to operate. In this manner, the device is capable of using a more suitable communication module for connecting to the server.

The plurality of communication modules further includes a low-speed communication module that is a long-distance communication module having a lower communication speed than a high-speed communication module that is the long-distance communication module, and in the causing, when the receiving is performed, (a) the low-speed communication module may be further caused to operate and (b) a second connection may be further established between the server and the device through the low-speed communication module.

With this, in a state in which the low-speed communication module is already connected, the device receives the information for the short-distance wireless communication, starts operating the long-distance communication module (high-speed communication module), and the like. In the communication by the low-speed communication module, services that the user can enjoy are limited, since communication traffic is restricted to a small amount. As such, along with initially being capable of enjoying limited control with the low-speed communication module, the device is capable of receiving higher level control with fewer limitations, by subsequently causing the high-speed communication module or the short-distance communication module to start operating. In this manner, the device is capable of being connected to the control cloud and controlled accordingly.

In the causing, it may be determined whether a third connection is established to the server through the high-speed communication module, when the high-speed communication module is caused to start operating, and the server may be caused to communicate with the server via the second connection, when it is determined that the third connection is not established.

This enables the device to communicate with the server through the low-speed communication module, when connection through neither the short-distance wireless communication nor the high-speed communication module is possible. This enables the device to be connected to the control cloud and controlled accordingly.

In the causing, an image may be displayed on the display screen that prompts the user to use the short-distance communication module for the connection between the device and the server, when it is not possible to communicate with the server via the second connection.

This enables the device to be connected to the server through the short-distance communication based on an operation performed by the user, when communication with the server using the high-speed communication module and the low-speed communication module is not possible. This enables the device to be connected to the control cloud and controlled accordingly.

The device may store information necessary to the long-distance wireless communication by the long-distance communication module, and in causing, the information stored beforehand may be used, when causing the device to connect to the server through the long-distance wireless communication by the long-distance communication module.

This enables the device to be connected to the server through the long-distance communication module using the information stored beforehand, without needing to be provided with new information. This enables the device to be connected to the control cloud and controlled accordingly.

A device includes: a plurality of communication modules that include a long-distance communication module that is a communication module for long-distance wireless communication and a short-distance communication module that is a communication module for short-distance wireless communication, the plurality of communication modules each being capable of connecting the device to a server that manages the device; a receiver for receiving information necessary to the short-distance wireless communication by the short-distance communication module, when the long-distance communication module and the short-distance communication module are not operating; a determiner that determines whether the information received by the receiver satisfies a condition indicating that the information received in the receiving is sufficient for a first connection to the server using the short-distance communication module; and a controller that causes the long-distance communication module to start operating, when the determiner determines that the information does not satisfy the condition.

This produces the same advantageous effect as the above device.

A system according to the present disclosure includes the above device and the server that is capable of being connected to the device through each of the plurality of communication modules.

This produces the same advantageous effect as the above device.

Advantageous Effect of Invention

A device of the present disclosure is capable of being connected to a control cloud and controlled accordingly.

BRIEF DESCRIPTION OF DRAWINGS

FIG. 6 is an explanatory diagram showing an Internet connection rate of Internet-enabled appliances.

FIG. 8 is an explanatory diagram showing Wi-Fi and three LPWA methods.

DESCRIPTION OF EXEMPLARY EMBODIMENT

Hereinafter, an embodiment will be described in detail with reference to the drawings where required. However, unnecessarily detailed descriptions may be omitted. For example, detailed descriptions of well-known matters or descriptions of components that are substantially the same as components described previous thereto may be omitted. This is to avoid redundancy and facilitate understanding of the descriptions for those skilled in the art.

Note that the inventor(s) have provided the accompanying drawings and subsequent descriptions to facilitate sufficient understanding of the present disclosure by those skilled in the art, and are thus not intended to limit the scope of the subject matter recited in the claims.

Hereinafter, first, underlying knowledge forming the basis of the present invention and technical problems to be overcome the invention will be described in greater detail, followed by description of an exemplary embodiment.

Underlying Knowledge Forming Basis of Present Invention

Figure 1:
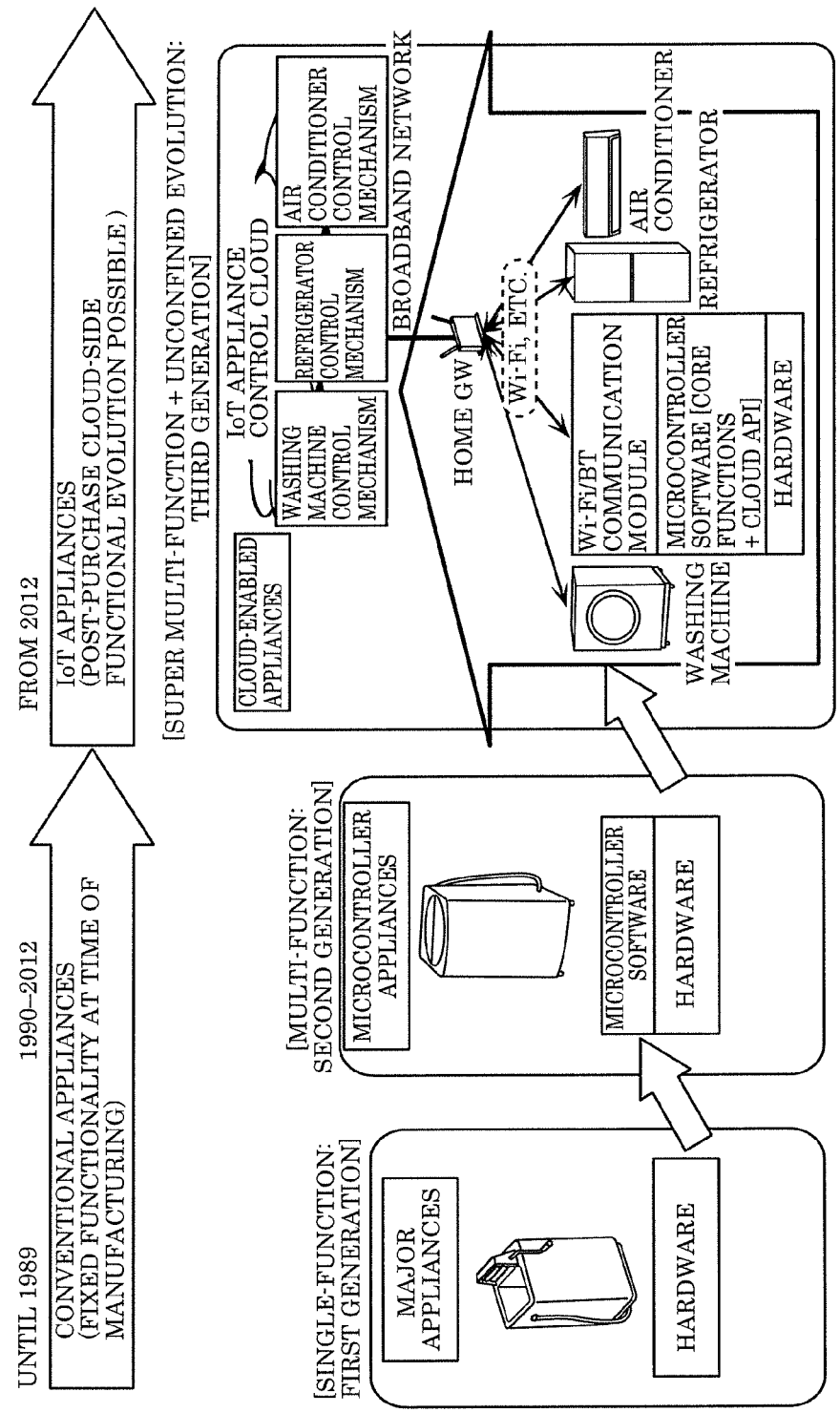
FIG. 1 is an explanatory diagram showing the evolution of household appliances.

FIG. 1 is an explanatory diagram showing the evolution of household appliances.

FIG. 1 shows the evolution of an architecture of household appliances (major appliances such as washing machines and refrigerators, air conditioners, humidifying air cleaners, etc.).

First-generation household appliances (before 1990) were single-function products, since they included hardware such as a compressor and a motor implemented through a control logic made of large-scale integrated (LSI) circuits.

Second-generation microcontroller household appliances (from 1990 to approx. 2010) made it possible to implement multi-function appliances, due to complex controls becoming possible, by introducing microcontrollers and creating microcontroller software. However, it was not possible to change or add functionality by changing the microcontrollers after shipment.

Third-generation cloud-enabled appliances (from 2012) have communication functionality such as Wi-Fi® and Bluetooth® (hereinafter, referred to as BT), making it possible to connect to an (Internet of Things) IoT appliance control cloud via a home gateway (GW) and a broadband network. Thus, it has also become possible to update microcontroller software in appliances from the cloud after shipment. It has also become possible to add and update functionality after shipment, by, for example, updating a control mechanism of a cloud-side device without updating its microcontroller software. The IoT appliance control cloud here is a cloud (aggregate between server and network) that controls appliances through a communication channel such as a broadband network, and is one of cloud-based services.

Figure 2:
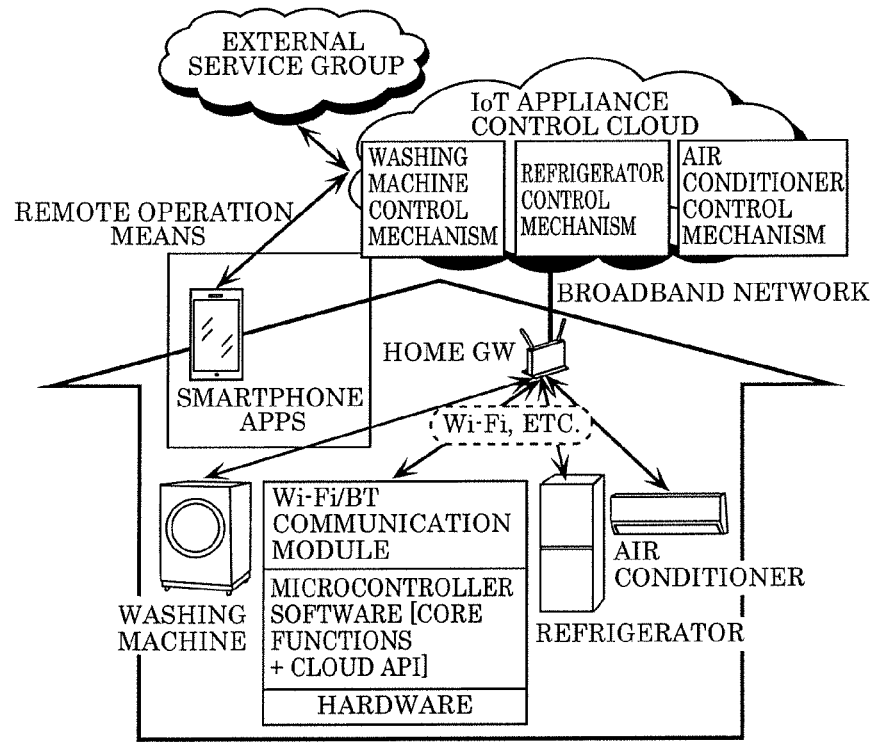
FIG. 2 is an explanatory diagram showing an example of an architecture of third-generation household appliances and an external service linkage.

FIG. 2 is an explanatory diagram showing an example of an architecture of third-generation household appliances and an external service linkage.

In the case of third-generation cloud-enabled household appliances (major appliances such as washing machines and refrigerators, air conditioners, humidifiers), it is possible to access each household appliance in a household from smartphone applications (apps) via each household appliance control mechanism of the IoT appliance control cloud.

Thus, it is possible to remotely monitor operating conditions of each household appliance and remotely operate (turn on, turn off, adjust temperature, dispense detergent, etc.) each household appliance from smartphone apps. By linking an external service group such as an e-commerce service cloud or a monitoring service cloud, and each household appliance control mechanism in the IoT appliance control cloud, it is possible to (i) control household appliances from various types of service clouds, or (ii) retrieve operation information (logs, etc.) of the household appliances and use this information for external services.

Figure 3:
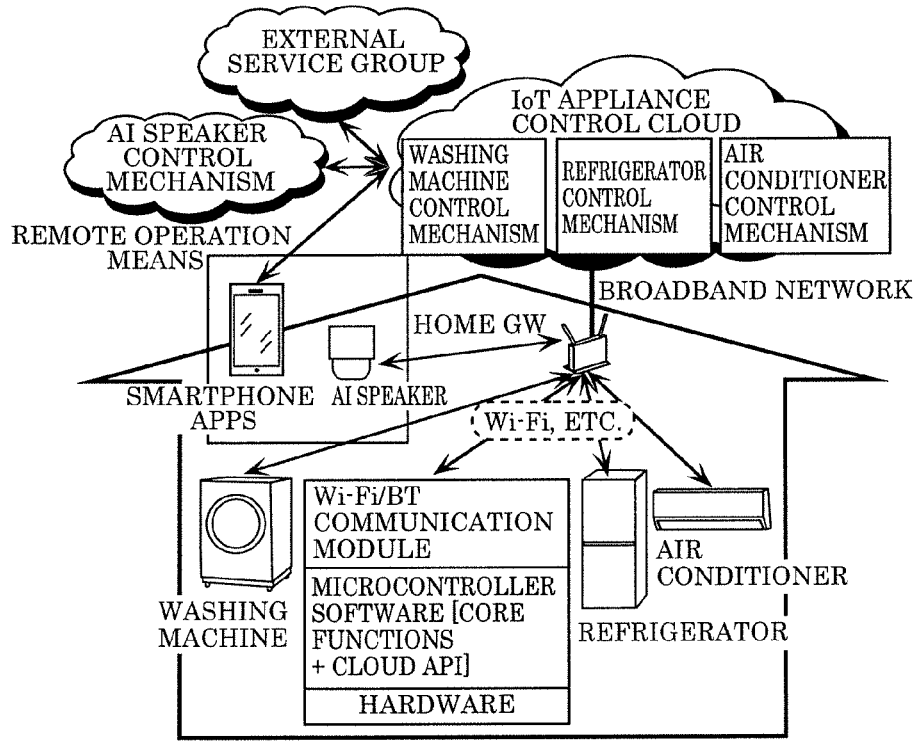
FIG. 3 is an explanatory diagram showing an example of an architecture of third-generation household appliances and an artificial intelligence (AD speaker linkage.

FIG. 3 is an explanatory diagram showing an example of an architecture of third-generation household appliances and an artificial intelligence (AI) speaker linkage.

In the case of third-generation cloud-enabled household appliances (major appliances such as washing machines and refrigerators, air conditioners, humidifiers), by accessing an AI speaker control mechanism in a cloud from a voice-interactive AI speaker via a home GW, and due to this AI speaker control mechanism accessing each household appliance control mechanism, it is possible for a user to remotely control each household appliance through voice interaction with the AI speaker.

Technical Problems to be Solved

Figure 4:
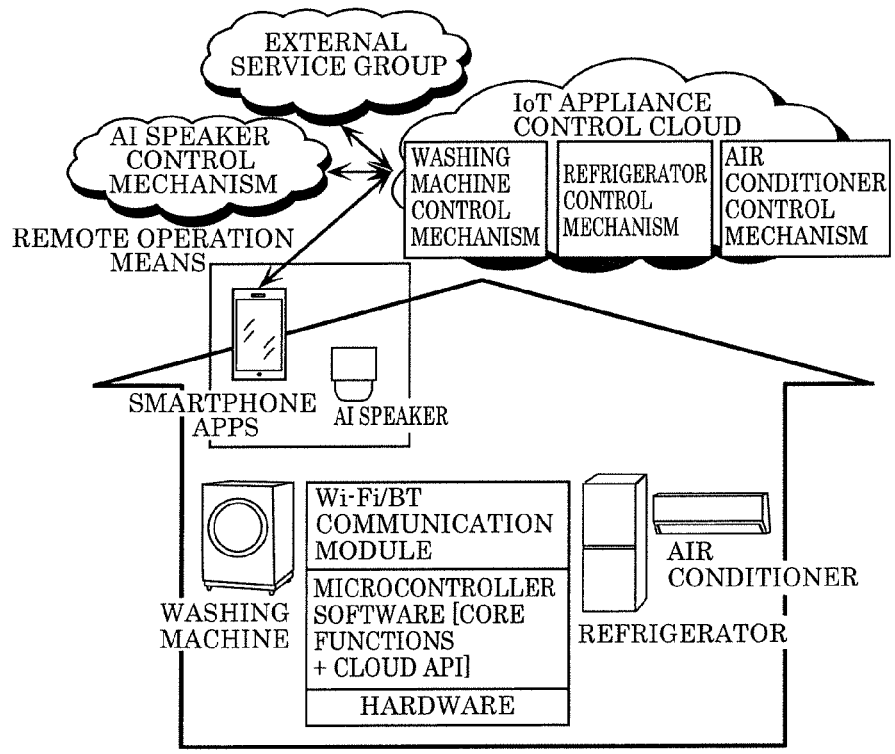
FIG. 4 is an explanatory diagram showing a first technical problem of third-generation household appliances.

FIG. 4 is an explanatory diagram showing a first technical problem of third-generation household appliances. The first technical problem is that it is not possible to use the functionality of third-generation household appliances in a household without a Wi-Fi GW.

Even when a certain household purchases a third-generation cloud-enabled household appliance (major appliance such as a washing machine and refrigerator, air conditioner, humidifier), it is not possible for the cloud-enabled household appliance to connect to the IoT appliance control cloud, when this household does not have a home GW such as Wi-Fi and it is not possible to connect to a broadband network. In this case, it is not possible to achieve the objective of increasing added value of post-purchase products through cloud-side functional evolution that third-generation household appliances exhibit. Thus, the third-generation household appliances can only be used as conventional second-generation household appliances (microcontroller household appliances) having fixed functionality at the time of manufacturing, despite being IoT appliances.

Figure 5:
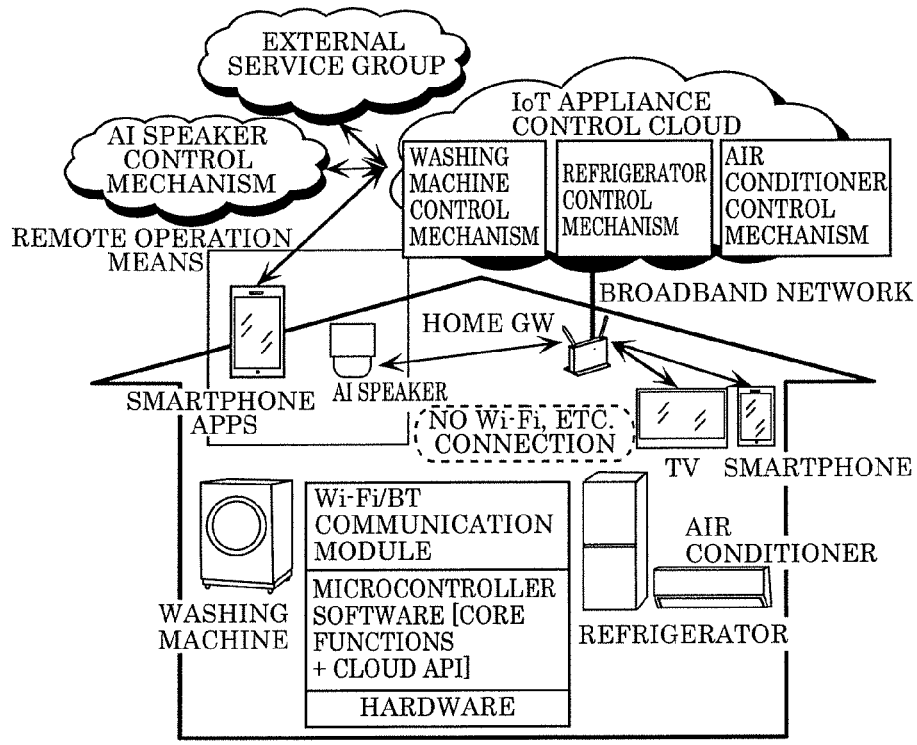
FIG. 5 is an explanatory diagram showing a second technical problem of third-generation household appliances.

FIG. 5 is an explanatory diagram showing a second technical problem of third-generation household appliances. The second technical problem is that it is not possible to for the user to connect third-generation household appliances to a Wi-Fi GW even when their household has a Wi-Fi GW.

When information devices such as smartphones, tablets, and PCs, or AI speakers are not capable of connecting to the Internet through Wi-Fi and the like, the user is not capable of using the desired original functionality of these products. Among smartphones (iPhone®) or AI speakers, there are devices that cannot even be used without connecting to the Internet and configuring user information (mail address, account, etc.). Since the user has purchased such devices because they want to use their functionality, the user will definitely configure user ID settings and Wi-Fi settings.

In the case of smart TVs, too, video streaming services such as Youtube, Netflix, Amazon Prime Video, and the like are becoming more widely used, and in order to watch such video content on a large-screen TV, the user (or installer) often configures Wi-Fi settings.

In the case of cloud-enabled household appliances, the user often does not immediately configure Internet connections settings, since the user has already had to configure tedious Wi-Fi settings and finds the Internet service that has become available difficult to understand, or because the user does not believe the value of using this Internet service is necessary.

It is also common that the user does configure the Wi-Fi settings immediately after purchasing a cloud-enabled household appliance, but ends up disconnecting the household appliance or does not reconnect the household appliance when it has been disconnected for some reason, when the user feels that the Internet service is comparatively low in user-friendliness.

Therefore, it is possible to develop various types of cloud services for information devices and AI speaker with the assumption that they will be connected to the Internet, since it is possible to expect a connection rate of approximately 100%, but this cannot be expected in the case of TVs or household appliances.

FIG. 6 is an explanatory diagram showing an Internet connection rate of Internet-enabled appliances (audiovisual (AV) appliances and household appliances).

The above-mentioned cloud-enabled household appliances are capable of providing customer value that microcontroller household appliances do not possess, by connecting to the IoT appliance control cloud and using various types of cloud services, due to means of communication such as Wi-Fi or Bluetooth being installed in the cloud-enabled household appliances. Thus, it is possible to improve customer satisfaction, since it is possible to provide customer value that outweighs an increase in cost due to installing communication means such as Wi-Fi in the cloud-enabled household appliances.

However, the above-mentioned means of communication have the problems of (i) in most cases as shown below, the settings of a device not having been configured by the user owning the device, i.e., a cloud-enabled household appliance not having been connected to the cloud, and (ii) only being able to provide the same customer value as microcontroller household appliances.

(1) In order to connect to Wi-Fi, the user needs to prepare a Wi-Fi access point in their home. However, among users that only connect to the Internet from their smartphone, i.e., users that only use a communication network provided by a communications service provider, there are cases in which the user does not have a Wi-Fi access point in their home.

(2) Even when there is a Wi-Fi access point present in the user's home, it is difficult to say that every person is capable of easily configuring their Wi-Fi connection, due to the complexity of the connection settings of appliances, e.g. a connection process starting off with inputting a password.

The network connection rate of cloud-enabled TVs or cloud-enabled household appliances on the Japanese market in 2017, as illustrated in FIG. 6, falls under 50%, meaning that many users in reality use their cloud-enabled household appliances as microcontroller household appliances.

Figure 7:
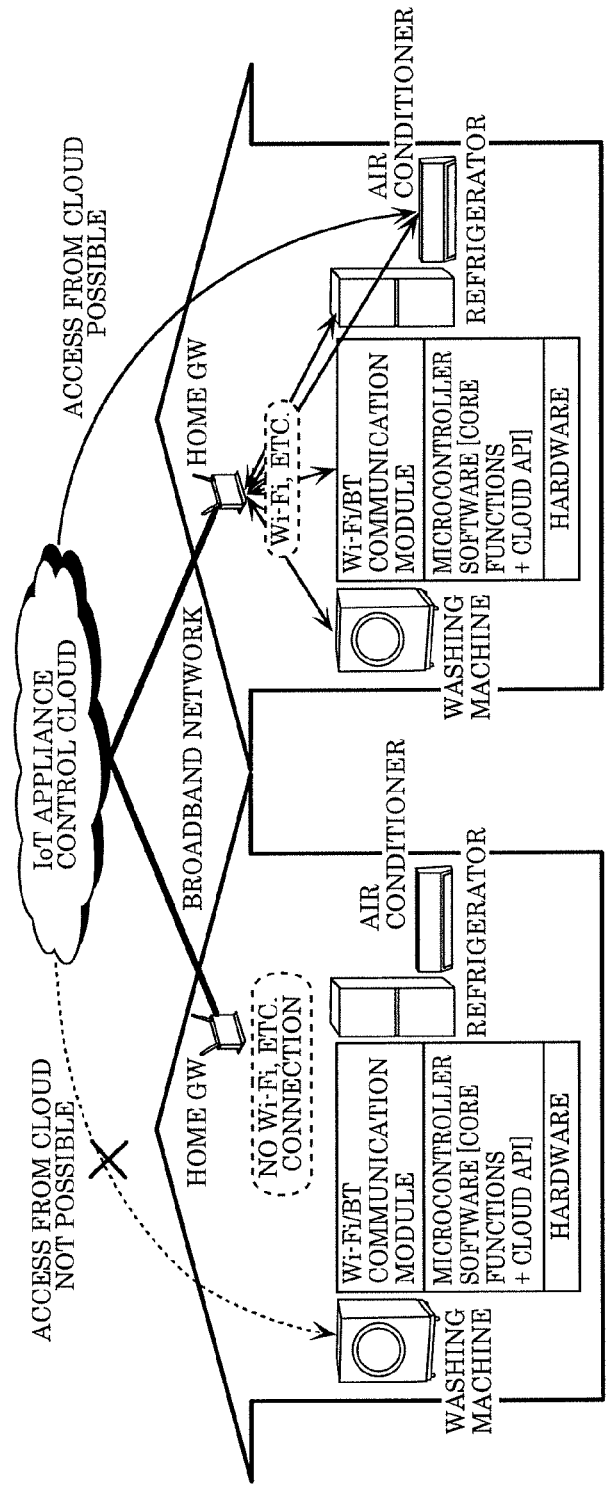
FIG. 7 is an explanatory diagram showing Internet connections and the like of cloud-enabled household appliances.

FIG. 7 is an explanatory diagram showing Internet connections and the like of cloud-enabled household appliances.

When cloud-enabled household appliances are not connected to the cloud, it is not possible to access the cloud-enabled household appliances from the IoT appliance control cloud. Thus, it is not possible to increase the added value of post-purchase products through cloud-side functional evolution, which is possible with cloud-enabled household appliances.

Thus, despite being cloud-enabled household appliances, they can only be used as having the same functionality as conventional microcontroller household appliances that have fixed functionality at the time of manufacturing.

Originally, cloud-enabled household appliances make it possible to take measures such as instructing an emergency stop, remote firmware updates, or sending a notification mail to the user with respect to target appliances, in the unlikely event of a recall and the like as well. However, in the current situation in which connection rates are low, manufacturers are often not capable of controlling these cloud-enabled household appliances from the IoT appliance control cloud. Thus, with respect to all target cloud-enabled household appliances, functionality, such as remote maintenance or recall notifications, that can be implemented when remote monitoring and controlling is possible, is not sufficiently implemented.

Accordingly, various means of communication for making devices besides appliances or sensors IoT-compatible have become available, also due to situations in which it is difficult to actually connect cloud-enabled household appliances fitted with means of communication such as Wi-Fi or BT to the cloud.

Especially a wireless means of communication developed for IoT applications called low-power wide-area (LPWA) has become commonplace and is receiving attention as a communication method suitable for the IoT era.

A characteristic of LPWA wireless technology is that, compared to Long-Term Evolution (LTE), it is possible to reduce the cost of both wireless circuits and infrastructure, since it is possible to (i) reduce terminal costs through small-scale semiconductor packaging, and (ii) reduce the number of base stations through low-rate modulation that can be obtained from an exceedingly long communication distance (up to 10 km). On the other hand, since means of reducing transfer rates and improving reception sensitivity have been adopted, data volume that can be transferred is low.

By installing LPWA wireless technology in appliances, users are no longer required to sign up for an Internet connection, appliances are directly connected to base stations, and it is possible to greatly reduce the cost of services connected to a cloud server.

LPWA is divided into cellular LPWA and non-cellular LPWA. Cellular LPWA uses frequency bands allocated by a cellular carrier (licensed bands) and provides these frequency bands as one of cellular networks (LTE, etc.).

Non-cellular LPWA uses LPWA wireless technology and takes advantage of the fact that channel usage fees are no longer necessary when using non-licensed bands that exist in each country. Since non-licensed bands are shared between other wireless systems, restrictions to avoid channels being monopolized are stipulated in each country's Radio Act.

The major LPWA methods will be described below.

FIG. 8 is an explanatory diagram comparing Wi-Fi with three LPWA methods.

1) Cellular LPWA
1.1) NB-IoT

A standard that has its origin in the Global System for Mobile Communications (GSM®) (2G), adopts the advantages of low transfer rates and LTE communication sequence, and is optimized for IOT data transfer. By having the same channel spacing of 200 kHz as GSM, switching to operating on a GSM channel is made easy. Sensitivity points are improved by having a low uplink transmission peak rate of 62.5 kbps, and receiving and storing data through repeated transmission (64 times). The maximum link budget is at a high 150 dB. By limiting transmission power to 100 mW (GSM's transmission power is 2 W), it is possible to limit a peak current and use NB-IoT with one battery.

1.2) LTE-M (CAT-M)

A standard that has its origin in LTE (4G), and performs communication using the smallest channel spacing of LTE (1.4 MHz). Since this standard is based on the slot configuration of LTE, it is possible to use the standard together with convention LTE communication slots. Sensitivity points are improved by a low uplink transmission peak rate of 1 Mbps, and receiving and storing data through repeated transmission. The maximum link budget is 150 dB.

Since transfer rates are rather high, power consumption when battery-driven is at a minimum. Transmission power is 200 mW.

2) Non-Cellular LPWA
2.1) LoRa

Uses conventional low-power wireless bands (Industrial, Scientific and Medical (ISM) bands), but reception sensitivity is improved through ultra-low-rate modulation. Ultra-low-rate modulation is implemented by using a special spread spectrum modulation called LORA chirp modulation. Characteristics of LoRa chirp modulation are that (i) a low transfer rate of 250 bps and a spread bandwidth of 125 kHz are implemented, and (ii) a high sensitivity against noise interference can be obtained. Since it is possible to select multiple data rates in the same bandwidth and to simultaneously receive these in the same channel, communication capacity is improved. The maximum link budget is 152 dB. Transmission power is 20 mW.

LoRa retains the characteristics of conventional low-power wireless technology (low-power and low-current peaks), making it possible to run the technology with one battery for ten years or with a coin cell.

Specifications have been standardized through the LoRa Alliance, making interconnection between operators possible.

2.2) Sigfox

Uses conventional low-power wireless bands (ISM bands), but reception sensitivity is improved through ultra-low-rate modulation. Ultra-low-rate modulation is implemented through narrowband frequency-shift keying (FSK), and the problem of frequency errors is overcome through digital demodulation processing at base stations. Sigfox modulation has a fixed uplink rate of 100 bps and a fixed downlink rate of 600 bps. The influence of noise interference is avoided through multiple transmissions in different frequencies. Due to the fixed rates and simultaneous multiple receptions not being possible, communication capacity is comparatively small. The maximum link budget is 158 dB. Transmission power is 20 mW.

Sigfox retains the characteristics of conventional low-power wireless technology (low-power and low-current peaks), making it possible to run the technology with one battery for ten years or with a coin cell.

Sigfox has proprietary specifications, and its base stations are monopolized by Sigfox.

Since Sigfox only allows one-way communication, Sigfox can be used for sensor-type IoT, but is not suitable for IoT household appliances.

Embodiment

Hereinafter, a device capable of being connected to a control cloud and controlled accordingly will be described.

Figure 9:
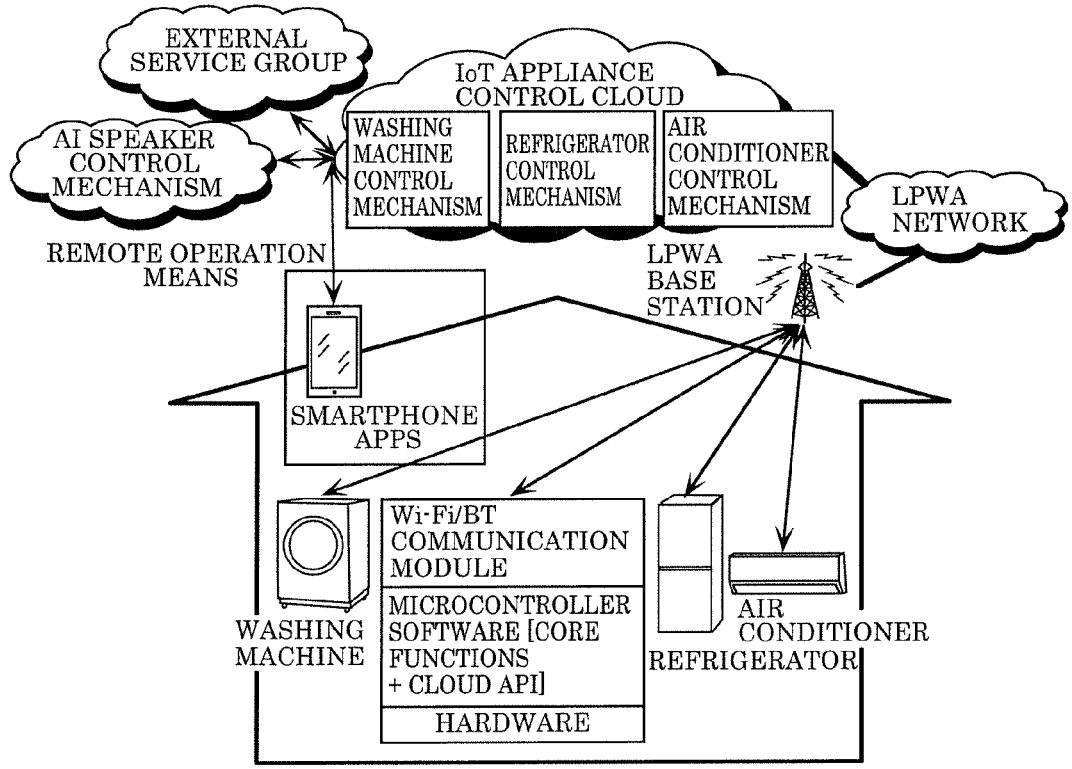
FIG. 9 is a first explanatory diagram showing an architecture of fourth-generation household appliances and an external service linkage.

FIG. 9 is a first explanatory diagram showing an architecture of fourth-generation household appliances (always-connected IoT appliances) and an external service linkage. Household appliances are, for example, major appliance such as washing machines and refrigerators, air conditioners, and humidifiers, and are also simply referred to as devices.

In order to solve the technical problem of third-generation household appliances, it was necessary for all users using household appliances to have a Wi-Fi GW, to develop services that made users want to connect their household appliances to the Internet and use them continuously, and make Wi-Fi settings easy to configure.

However, with the emergence of various means of communication in recent years, a means of communication named low-power wide-area (LPWA) has been proposed and gaining attention that is capable of connecting appliances to a cloud more easily than previously possible.

LPWA is characterized by being usable without users needing to configure any settings, implements an exceedingly long communication distance (until 10 km), and can be connected to a base station without fail if there is reception.

With fourth-generation household appliances (always-connected IoT appliances), it is possible to connect to a cloud, making post-purchase cloud-side functional enhancement possible, without users needing to prepare a Wi-Fi GW and configure tedious Wi-Fi settings, by installing LPWA technology in the household appliances.

Figure 10:
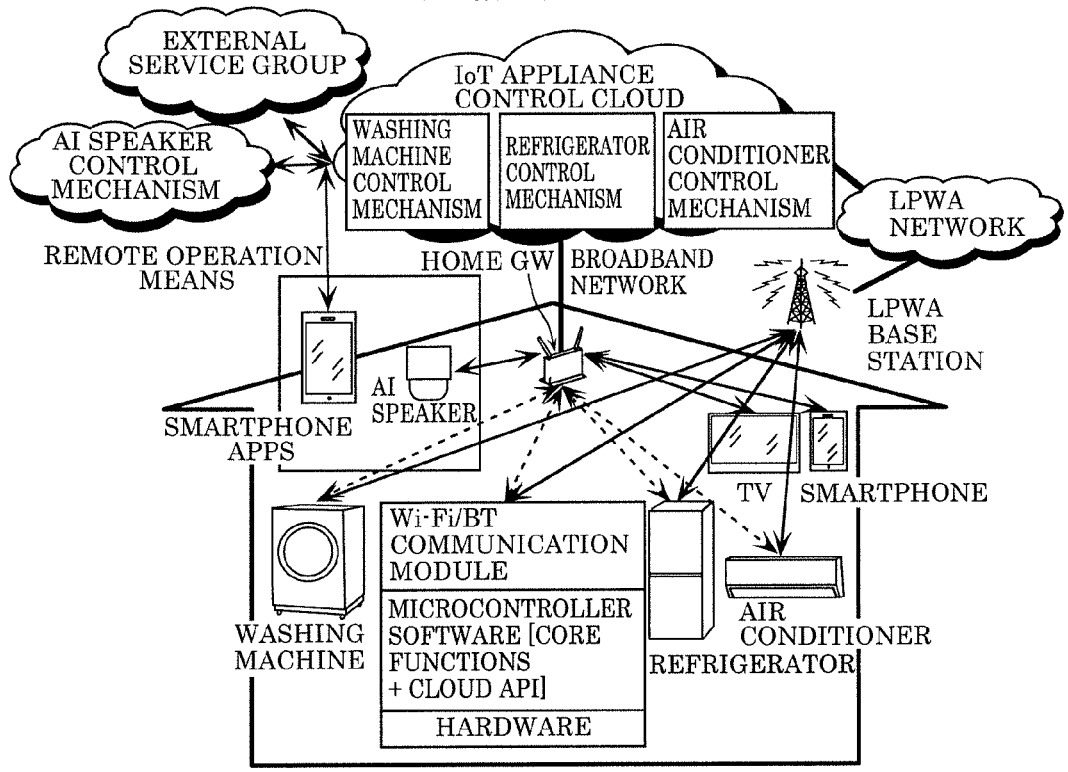
FIG. 10 is a second explanatory diagram showing an architecture of fourth-generation household appliances and an external service linkage.

FIG. 10 is a second explanatory diagram showing an architecture of fourth-generation household appliances (always-connected IoT appliances) and an external service linkage.

While LPWA has outstanding features as stated above, since means of reducing transfer rates and improving reception sensitivity have been adopted, the volume of data that can be transferred is low compared to Wi-Fi, LTE, or the like. Thus, when fourth-generation household appliances (always-connected IoT appliances) have not only LPWA technology, but also Wi-Fi, similar to third-generation household appliances, suitable communication in accordance with usage becomes possible.

Figure 11:
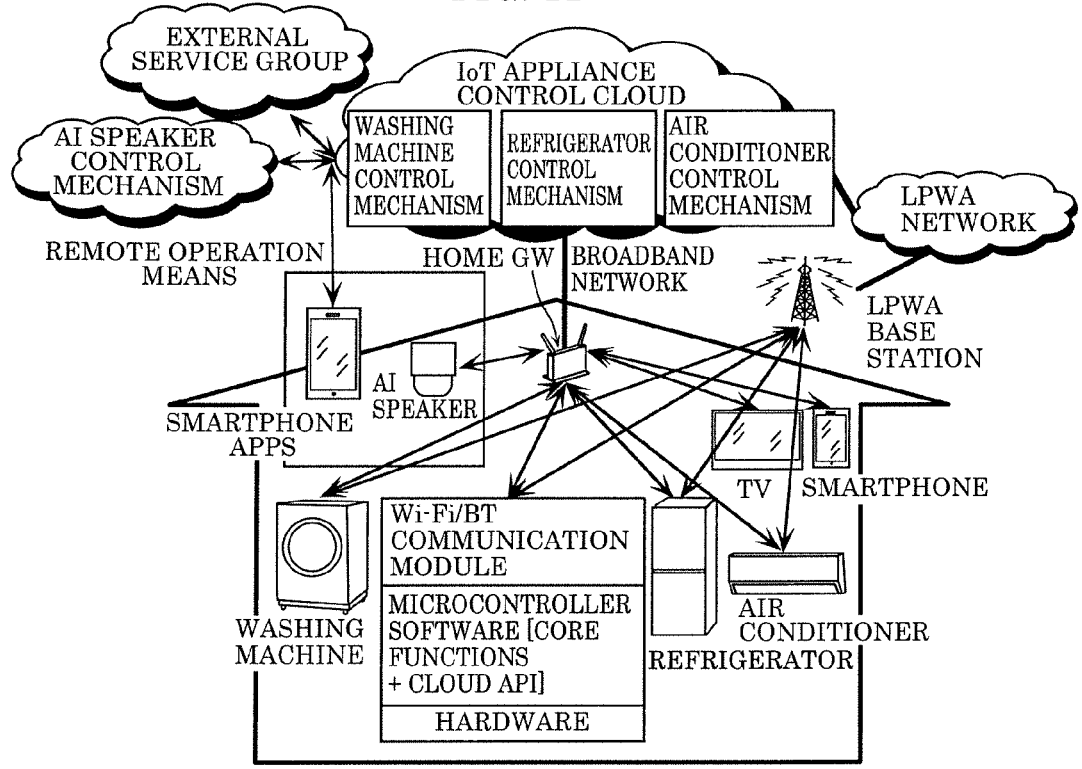
FIG. 11 is a third explanatory diagram showing an architecture of fourth-generation household appliances and an external service linkage.

FIG. 11 is a third explanatory diagram showing an architecture of fourth-generation household appliances and an external service linkage.

With regard to compelling users to configure tedious Wi-Fi settings, which was one big technical problem of third-generation household appliances, it is possible to simplify the settings by using LPWA for the Wi-Fi settings, as shown in the example below.

(1) Input Wi-Fi settings to a cloud, and fourth-generation household appliances (always-connected IoT appliances) obtain the Wi-Fi settings from the cloud using LPWA and connect to a Wi-Fi GW.

(2) Input the Wi-Fi settings to one fourth-generation household appliance (always-connected IoT appliance), transmit the Wi-Fi settings to other devices in the house via the LPWA network, and the other devices use those settings to connect to the Wi-Fi GW.

Figure 12:
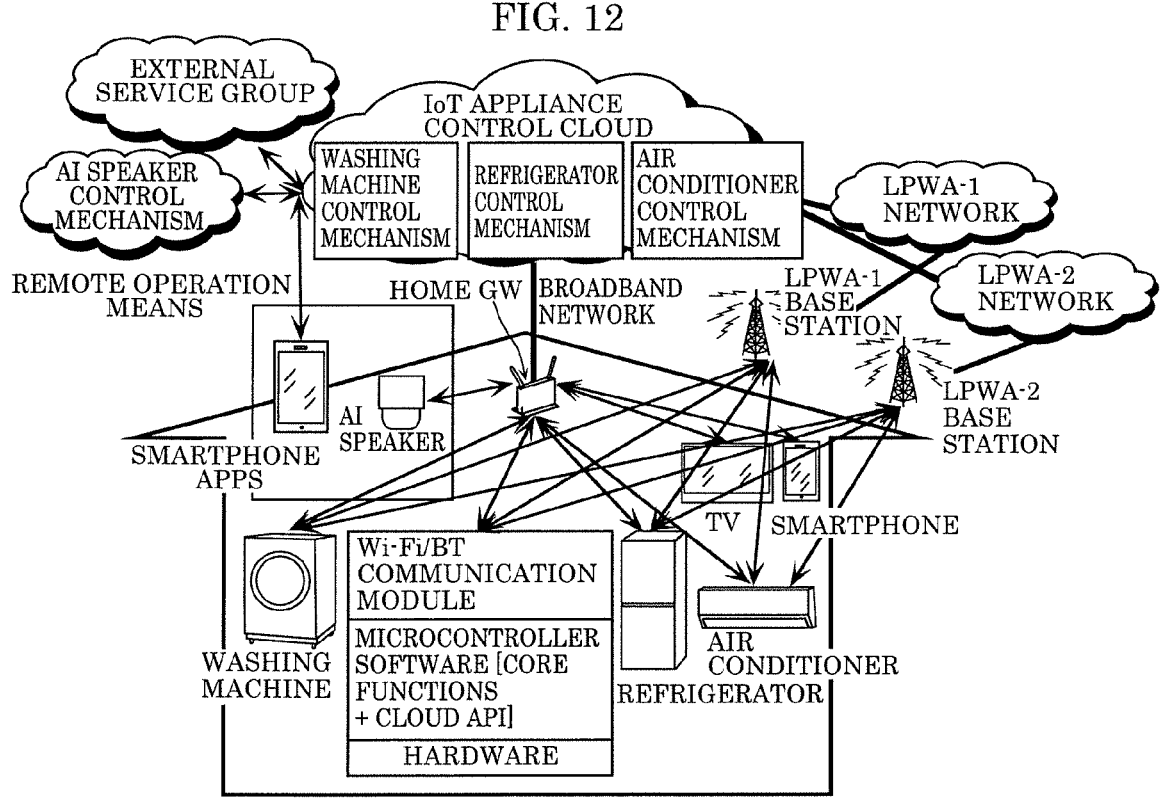
FIG. 12 is a fourth explanatory diagram showing an architecture of fourth-generation household appliances and an external service linkage.

FIG. 12 is a fourth explanatory diagram showing an architecture of fourth-generation household appliances and an external service linkage.

LPWA is also capable of solving the problem of the volume of data that can be transferred being low compared to Wi-Fi and the like, as stated above, by having multiple LPWA technologies at the same time. LPWA is divided into cellular LPWA and non-cellular LPWA as the main systems. Cellular LPWA is characterized by the volume of data that can be transferred being high compared to non-cellular LPWA, since cellular LPWA uses frequency bands (licensed bands) allocated by a cellular carrier. Non-cellular LPWA is characterized by having an easy-to-manage cover area, since it is also possible for appliance manufacturers to dispose base stations because non-cellular LPWA does not require a license. This implements always-connected IoT appliances that are capable of maintaining a situation in which the IoT appliances are constantly connected to the cloud when operating, due to the IoT appliances having at least one LPWA technology in addition to Wi-Fi.

Figure 13:
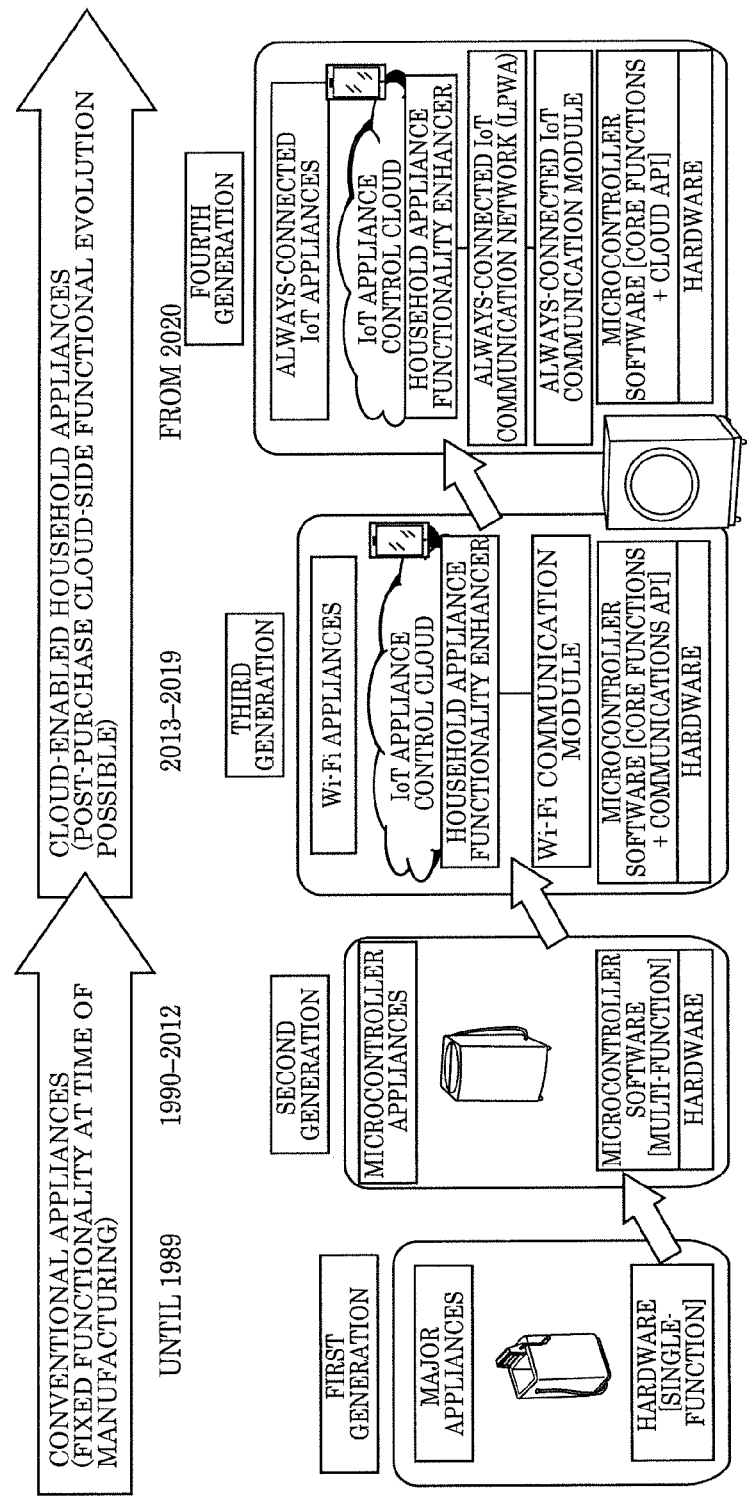
FIG. 13 is an explanatory diagram showing an evolution toward Internet of Things (IoT) appliances connected by an always-connected communication network.

FIG. 13 is an explanatory diagram showing an evolution toward IoT appliances connected by an always-connected communication network. FIG. 13 shows the evolution of an architecture of household appliances (major appliances such as washing machines and refrigerators, air conditioners, humidifying air cleaners, etc.).

First-generation household appliances (before 1990) are single-function products that are implemented through mechanics, such as a compressor and a motor, and control logic.

Second-generation microcontroller household appliances (until approx. 2010) enable complex controls, through the creation of microcontroller software. Thus, second-generation household appliances are multi-functional, but it was difficult to change or add functionality by changing the microcontroller software after shipment.

Third-generation cloud-enabled appliances (from 2012) have communication functionality such as Wi-Fi and Bluetooth, making it possible to connect to an IoT appliance control cloud via a home GW and a broadband network. Thus, along with updating the microcontroller software inside a device from the cloud also after shipment of the device, it has become possible to add and update functionality after shipment, by, for example, updating a control mechanism of the device cloud-side without updating the microcontroller software. However, there were also many instances of not being able to connect all shipped products through Wi-Fi and the like, and not being able to use their cloud-based functionality.

In the case of fourth-generation always-connected IoT appliances (from 2020) having always-connected functionality through LPWA and the like, it has become possible to use cloud-based functionality with all products, since it is possible to connect all shipped products.

Figure 14:
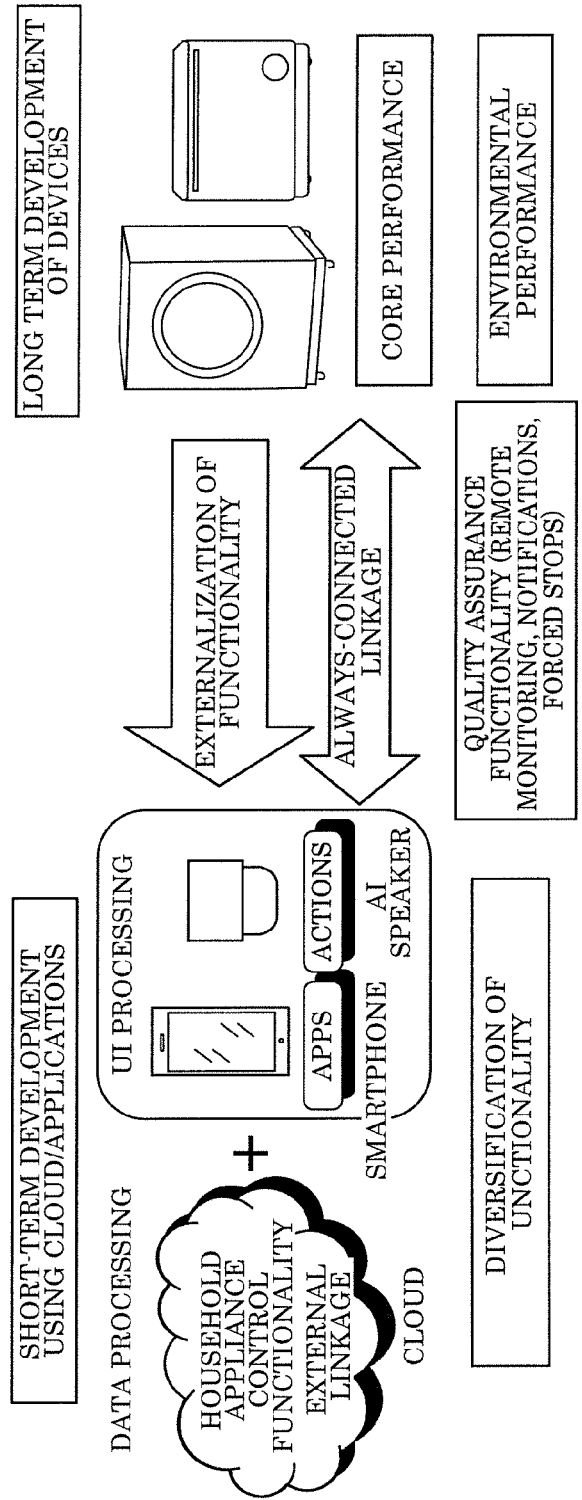
FIG. 14 is an explanatory diagram showing function sharing regarding IoT appliances.

FIG. 14 is an explanatory diagram showing function sharing regarding IoT appliances.

In the case of fourth-generation cloud-enabled household appliances (major appliances such as washing machines and refrigerators, air conditioners, humidifiers), function sharing (externalize functions) between a cloud/smartphones and devices is implemented, by connecting user interface (UI) devices such as smartphones through always-connected functionality. Thus, it is possible to improve functionality and performance of household appliances, by changing or adding functionality cloud-side after shipment.

Since it is possible to implement an always-on connection of all shipped products, it is possible to remotely monitor and remotely control all products after shipment. Thus, it is possible to expect great improvements to quality assurance functionality.

Even in an unfortunate case such as recall of all products, it is possible to trace target products even after shipment, transmit a malfunction notification, perform a forced stop, etc. Thus, it is possible to greatly reduce recall costs.

Figure 15:
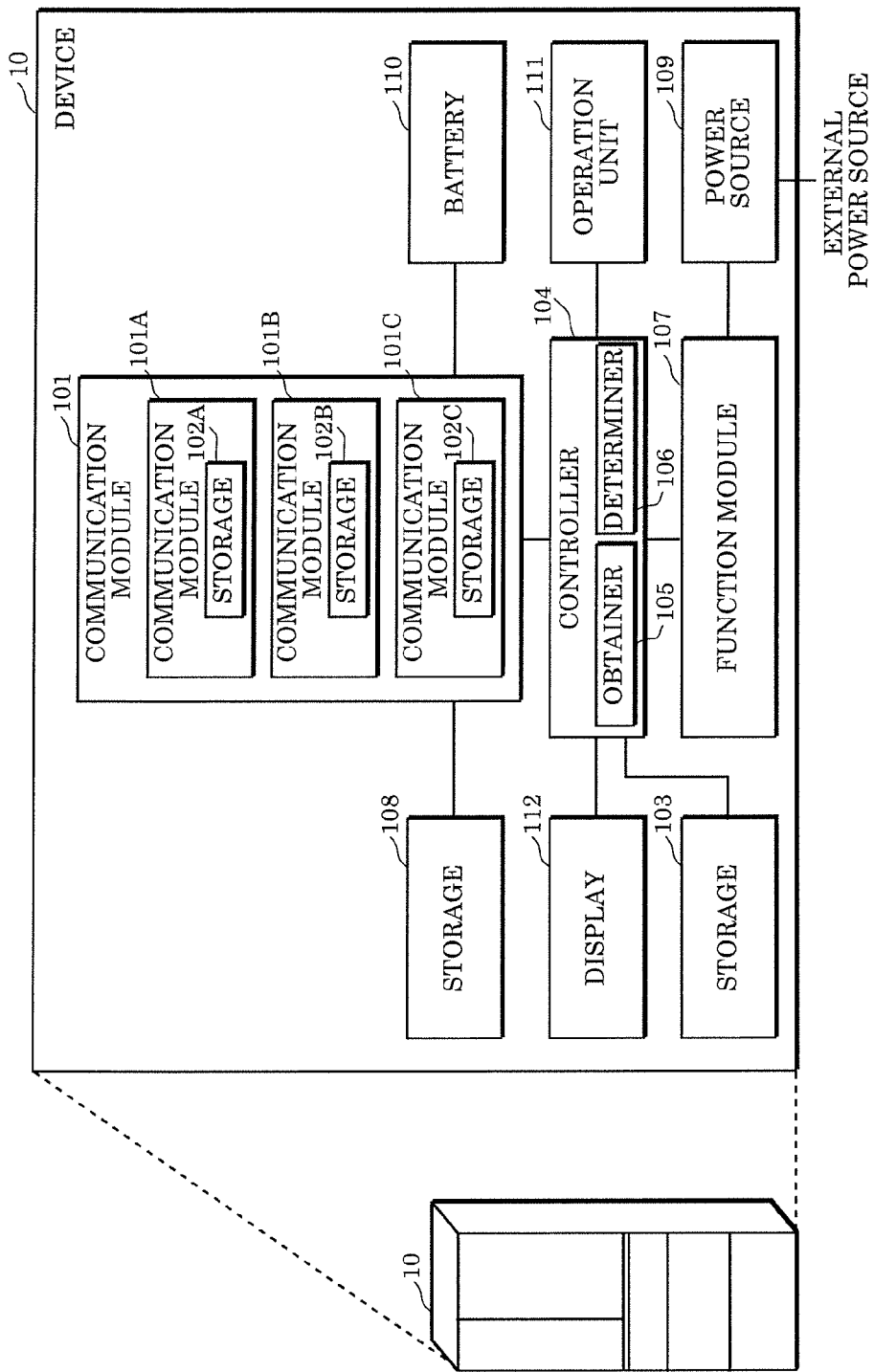
FIG. 15 is a configuration diagram showing blocks of a device that is an IoT appliance.

FIG. 15 is a configuration diagram showing blocks of device 10 that is an IoT appliance.

As illustrated in FIG. 15, device 10 includes communication module 101, storage 103, controller 104, function module 107, storage 108, power source 109, battery 110, operation unit 111, and display 112. Controller 104 includes obtainer 105 and determiner 106.

Communication module 101 includes a plurality of communication modules that include a long-distance communication module that is a communication module for long-distance wireless communication and a short-distance communication module that is a communication module for short-distance wireless communication. Device 10 is capable of being connected to the server (appliance cloud) that manages device 10 through each of the above plurality of communication modules. To be specific, communication module 101 includes a plurality of wireless communication modules 101A, 101B, and 101C. Communication modules 101A, 101B, and 101C respectively include storages 102A, 102B, and 102C that store a module ID of a corresponding communication module. The information (Access Point Name (APN)) and the like necessary to the long-distance communication by the long-distance communication module is initially configured. However, the information (Service Set Identifier (SSID)) necessary to the short-distance communication by the short-distance communication module does not need to be initially configured. Since the contents of the information necessary to the short-distance communication differ depending on the place (home, office, etc.) in which the short-distance communication is used, the information is usually configured by the user in accordance with the place in which the short-distance communication is used.

Note that the operation of communication modules 101A, etc. refers to supplying electric power to the communication module, and causing the communication module to perform a process according to transmission and reception of radio waves including transmission/reception frames, a generation process of frames to be transmitted, a reading process of received frames, a process related to establishing a communication connection, etc.

Storage 103 stores properties regarding the communication of each of multiple networks. The properties include, for example, an index indicating the magnitude of the stability of the communication, information indicating the speed of the communication, information indicating costs necessary for the communication, or the like.

Obtainer 105 obtains communication possibility information including, for example, (i) information indicating whether each of the plurality of communication modules 101A, 101B, and 101C is connected to a network, and (ii) information indicating whether communication with a server using each of the plurality of communication modules 101A, 101B, and 101C is possible.

Operation unit 111 is an input device that receives an operation performed by the user of device 10 and receives information in accordance with the received operation. To be specific, operation unit 111 is a processor for receiving, from the user, information necessary to the short-distance wireless communication by the short-distance communication module, when the long-distance communication module and the short-distance communication module are not operating. Note that operation unit 111 performs a process for receiving the information necessary to the above short-distance wireless communication from the user, but the user does not necessarily provide all of the necessary information. Thus, there are cases in which the information received from the user by operation unit 111 is not sufficient for performing the short-distance wireless communication, and in this case, the short-distance wireless communication is not performed even when the short-distance communication module is operating. Note that operation unit 111 corresponds to a receiver.

Determiner 106 determines whether the information received by operation unit 111 satisfies a condition indicating that the information is sufficient for a connection (first connection) to the server using the short-distance communication module.

Controller 104 causes the long-distance communication module to start operating, when determiner 106 determines that the information received by operation unit 111 does not satisfy the above condition.

Function module 107 produces the functionality of device 10.

Storage 108 is a storage device that stores a unique ID per device 10.

Power source 109 receives electric power from an external power source and supplies the electric power to components inside device 10.

Battery 110 supplies electric power to communication modules 101, etc. Battery 110 may be a primary battery and may also be a secondary battery.

Display 112 is a display device that displays various information on a display screen as an image.

A configuration of device 10 will be described in detail as an example of a refrigerator.

Even when device 10, which is a refrigerator, is connected to the Internet as an IoT device, device 10 is used as an appliance, and includes various modules in order to implement conventional appliance functionality. When device 10 is a refrigerator, such modules serve as a compressor for cooling down the inside of the refrigerator, an illumination device for illuminating the inside of the refrigerator when the door is opened, a sensor for measuring the temperature or humidity inside the refrigerator, etc. Such modules each correspond to function module 107. In a large appliance such as a refrigerator or an air conditioner, a configuration in which the large appliance is connected to the external power source via power source 109 is common.

In appliances of recent years, it is common for controller 104 to be installed using a microcomputer or a processor for controlling a variety of useful functionality. In the case of refrigerators having ice making functionality, for example, operations are performed such as (i) determining whether making ice is necessary using a sensor disposed in a dedicated plate on which the ice is stored and (ii) making new ice. In order to perform such specific operations, control is carried out by the microcomputer or the processor and software executed by the microcomputer or the processor.

Device 10 includes display 112 for presenting the user with various information, or operation unit 111 that allows the user to carry out complex operations.

Displays of conventional devices only displayed the minimum required information, such as an anomalous state or whether the device is energized, using a limited method such as a plurality of lamps or a number of several digits long. Simple operations, such as an instruction for quick freezing or a reset operation during a malfunction, were performed using only a few buttons.

In contrast, device 10 includes a compact touch panel display as operation unit 111 and display 112, making more complex status displays and various setting configurations possible.

Communication module 101 characterizes IoT appliances with respect to device 10. Communication module 101 stores, in storages 102A, 102B, and 102C, a module ID identifiable per device, i.e., communication modules 101A, 101B, and 101C; making connecting to the Internet possible using any of various means of communication such as Wi-Fi or LTE, or a multiple methods. When a plurality of communication modules are installed, a separate communication module ID is assigned per communication module, and serves as a communication identifier, which differs per communication method, e.g. telephone numbers for LTE. By connecting to the Internet, it becomes possible to (i) send various information collected by controller 104 to a server or (i) conversely obtain information necessary for controlling device 10 from the server. In recent years, Internet-enabled technology having low communication speed and low power consumption called LPWA has become available. LPWA makes a minimum amount of communication possible even when device 10 is not connected to an external power source, due to device 10 including battery 110, which is different from the external power source. Depending on the communication, it can be assumed that device 10 includes storage 108 that stores the unique ID per device 10, since it is necessary to perform control by assigning a specific appliance.

Controller 104 may display an image on a display screen that prompts the user to use any of the plurality of communication modules as one communication module used for a connection between device 10 and the server, when a predetermined period has passed since causing the long-distance communication module to operate.

Subsequently, controller 104 may cause the above one communication module to start operating or continue operating, upon receiving an instruction from the user to use the one communication module.

The plurality of communication modules may include a low-speed communication module that is a long-distance communication module having a lower communication speed than a high-speed communication module that is the long-distance communication module. In this case, controller 104 may cause, when operation unit 111 receives an operation from the user, (a) the low-speed communication module to operate and (b) a connection (second connection) to be established between the server and device 10 through the low-speed communication module. Note that the low-speed communication module is capable of operating using electric power from battery 110.

Controller 104 may cause the high-speed communication module to start operating and determine whether the third connection is established to the server through the high-speed communication module, when determiner 106 determines that the information received by operation unit 111 does not satisfy the above condition. The high-speed communication module may be caused to communicate with the server via the second connection, when it is determined that the third connection is not established.

Controller 104 may display an image on the display screen that prompts the user to use the short-distance communication module for the connection between device 10 and the server, when it is not possible to communicate with the server via the second connection.

Note that device 10 may store information necessary to the long-distance wireless communication by the long-distance communication module beforehand. In this case, controller 104 uses the information stored beforehand, when causing device 10 to connect to the server through the long-distance wireless communication by the long-distance communication module.

Hereinafter, an operation and processes of device 10 will be described in more detail.

Figure 16:
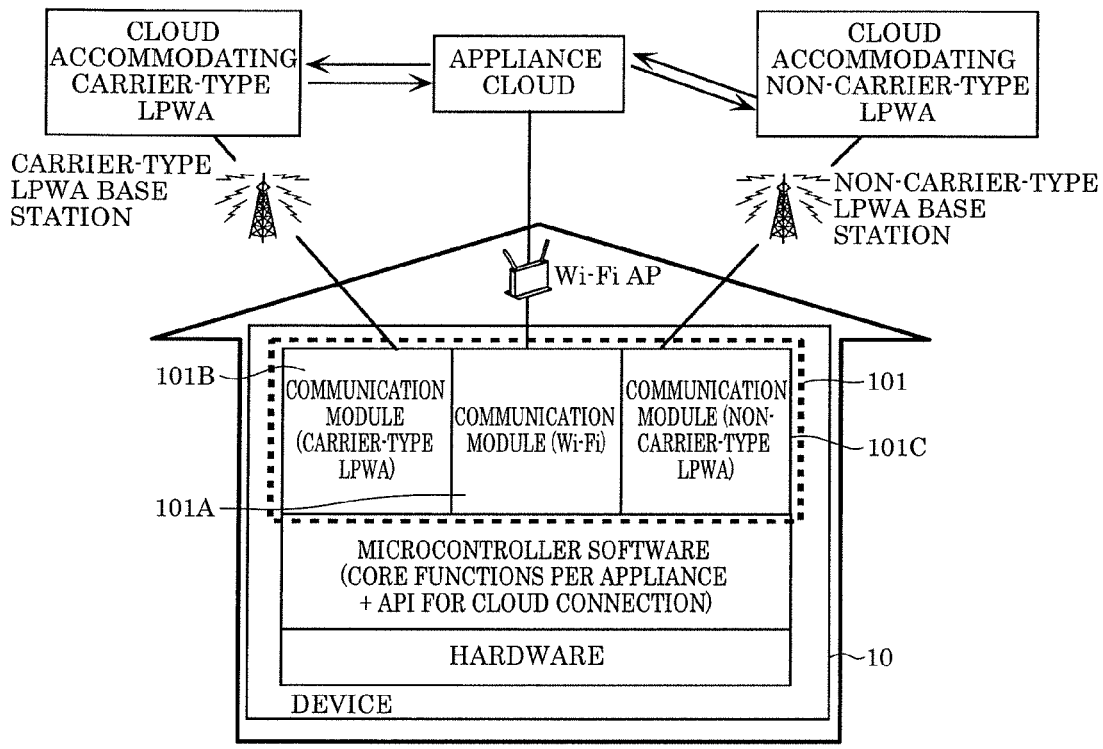
FIG. 16 is an explanatory diagram showing the device compatible with multiple communication methods.

FIG. 16 is an explanatory diagram showing device 10 compatible with multiple communication methods.

When applying various communication methods (Wi-Fi, Bluetooth, LPWA, etc.) to device 10, each communication method has advantages and disadvantages. As such, a configuration is proposed in which it is possible to select the most suitable communication method in accordance with how the IoT-compatible device 10 is used, the environment in which device 10 is set up, or the apps or services used for device 10, by applying two or more communication methods to device 10.

FIG. 16 shows (i) device 10 including three types of communication modules, Wi-Fi, carrier-type LPWA, and non-carrier-type LPWA, and (ii) a cloud accommodating each communication method. Here, communication module 101A corresponds to a Wi-Fi communication module, communication module 101B corresponds to a carrier-type LPWA communication module, and communication module 101C corresponds to a non-carrier-type LPWA communication module. Note that a total number of communication methods may be increased, and that there may also be two types of communication method.

In FIG. 16, "appliance cloud" is a cloud responsible for managing or controlling device 10. The appliance cloud is responsible for information regarding device 10, controlling device 10, or the like, via Wi-Fi, LPWA, or any type of network.

The "cloud accommodating carrier-type LPWA" is a cloud that accommodates device 10 connected to the appliance cloud via the carrier-type LPWA communication module. The information regarding device 10 (control information, appliance status, etc.) is transmitted to and received from the appliance cloud via the cloud accommodating carrier-type LPWA.

The "cloud accommodating non-carrier-type LPWA" is a cloud that accommodates device 10 connected to the appliance cloud via the non-carrier-type LPWA communication module. The information regarding device 10 (control information, appliance status, etc.) is transmitted to and received from the appliance cloud via the cloud accommodating non-carrier-type LPWA.

Figure 17:
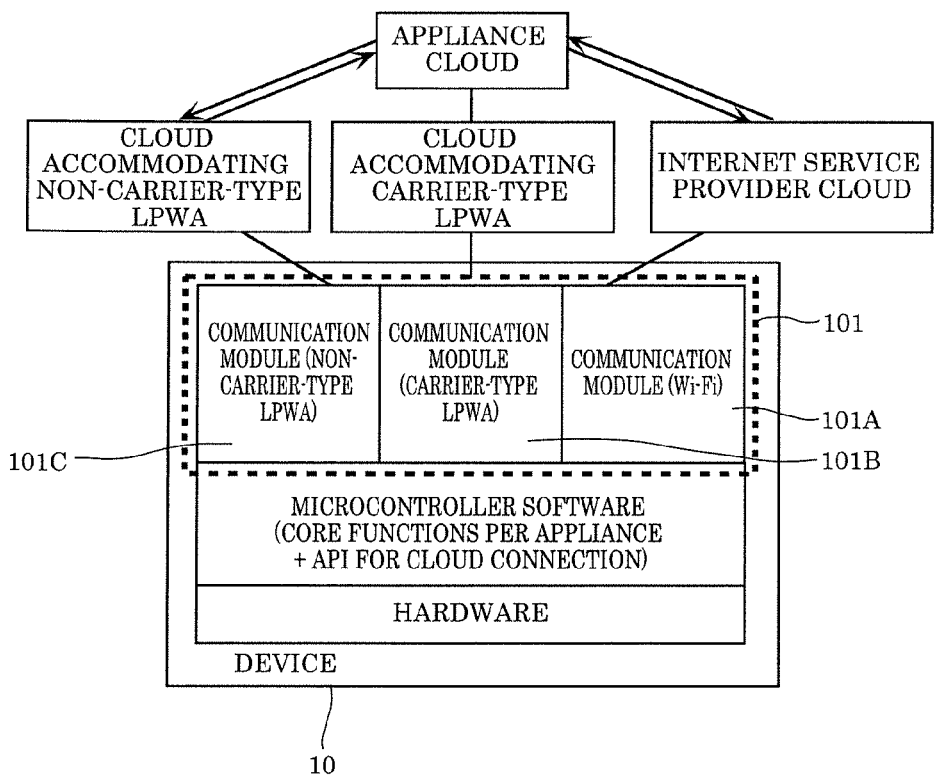
FIG. 17 is an explanatory diagram showing multiple access clouds compatible with the multiple communication methods.

FIG. 17 is an explanatory diagram showing multiple access clouds compatible with multiple communication methods. Note that the multiple access clouds are each a cloud for connecting device 10 to the appliance cloud or the Internet (aggregate between server and network), and to be specific, a cloud located between device 10 and the appliance cloud or the Internet.

FIG. 17 shows a configuration that includes (i) device 10 including the three communication modules, i.e., communication modules 101A, 101B, and 101C, and (ii) three access clouds. The three access clouds here are clouds connecting device 10 and the appliance cloud. Each access cloud is characterized as follows.

The cloud accommodating carrier-type LPWA is a cloud operated by a cellular carrier, and is wirelessly connected to communication module 101B (carrier-type LPWA communication module) included in device 10. Cellular technology makes it possible to provide reliable communication with comparatively high communication capacity, but communication cost is generally higher.

The cloud accommodating non-carrier-type LPWA is a cloud that connects non-cellular wireless devices, and includes LoRa, SIGFOX, or the like. Non-cellular technology has comparatively low communication capacity and is slightly less reliable, but has the advantage of having drastically lower communication cost.

Internet provider clouds are often wired from the cloud to the household, with, for example, an optical fiber or a cable television (CATV). Internet provider clouds have the advantage of having exceedingly high communication capacity and being capable of transferring movies. Residents generally sign up to an Internet Service Provider (ISP), and no additional costs are incurred by connecting device 10, since the subscription has a flat rate.

When using the above three access clouds, eliminating additional costs by using an ISP or reducing connection cost by using non-carrier-type LPWA are viable solutions in order to limit the connection cost from the point of the view of the user.

Figure 18:
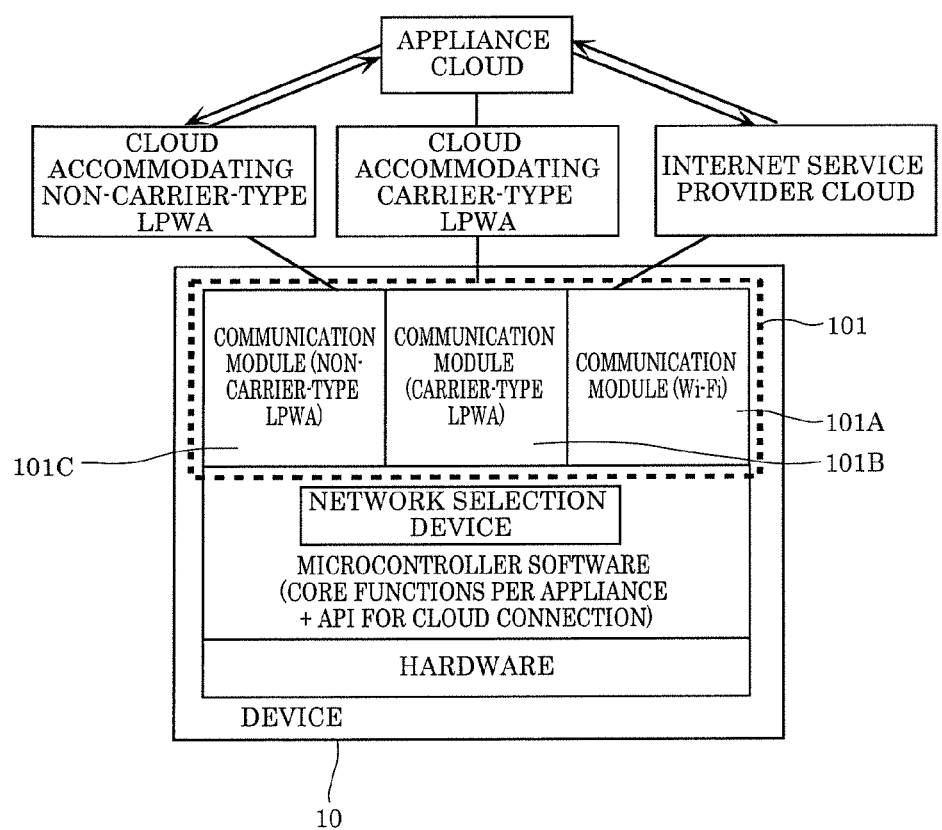
FIG. 18 is an explanatory diagram showing switching between the multiple access clouds.

FIG. 18 is an explanatory diagram showing switching between the multiple access clouds.

As illustrated in FIG. 18, the present invention is characterized by including a network selection device as a portion of the functionality implemented by the microcontroller software. The network selection device operates as follows.

The network selection device determines a network type so that a required communication speed is obtained and communication cost is at a minimum, from the point of view of the user of the appliance, i.e., device 10, and the appliance cloud provider. This is determined as follows.

When the user of device 10 has installed a broadband network of the ISP in their home, the network is connected from communication module 101A (Wi-Fi communication module) included in device 10 to the appliance cloud, via a Wi-Fi access point (AP) (not illustrated) and then via a broadband network of the ISP. In this case, the network selection device selects communication module 101A so that device 10 is connected to the appliance cloud through the ISP.

When device 10 detects that there is no connection to the ISP (Wi-Fi connection), either one of communication module 101B (carrier-type LPWA) and communication module 101C (non-carrier-type LPWA) is selected to connect device 10 and the appliance cloud.

When data to be transmitted from device 10 to the appliance cloud is not urgent (e.g. data may transmitted within one day) and the data volume of the communication is low, the network selection device selects the cheaper communication module 101C (non-carrier-type LPWA).

When the data volume is high or when the data volume is low but the data is urgent, more specifically, when for example an error code or the like needs to be transmitted immediately, the network selection device selects communication module 101B (carrier-type LPWA).

Note that a threshold for determining whether the data volume is high or low can be assigned to the network selection device from inside the appliance, the appliance cloud or from the outside.

A threshold to switch between communication module 101A and communication module 101B can be suitably changed in accordance with a change in network cost.

Costs of ON/OFF states of a subscriber identity module (SIM) will be described in detail below.

Note that an "ON state of the SIM" or an "ON state of SIM functionality" refers to enabling the functionality of the SIM, and more specifically, causing a communication module compatible with the SIM to start operating and communicably connecting a device including the SIM to a network, using an international mobile subscriber identity (IMSI) of the SIM. An "OFF state of the SIM" or an "OFF state of SIM functionality" refers to disabling the functionality of the SIM, and more specifically, causing the communication module compatible with the SIM to stop operating and disconnecting the device including the SIM from the network.

When using carrier-type LPWA, there is no need for a service provider using LPWA to be concerned about the quality of the LPWA network, since communication quality of the LPWA network is stable. When overusing communication through carrier-type LPWA, however, the service provider must be capable of collecting communication fees from the end user or the service will not be viable, since costs are too high.

As such, non-carrier-type LPWA that has unstable quality but is cheap may be used in combination with carrier-type LPWA, taking in consideration the type of service offered, period of time, conditions of the region, etc. In this case, the following (1)-(4) about communication costs are conceivable, since it is necessary to decide which network to use in accordance with how communication fees are approached.

(1) Concerning communication fees, there are cases in which it is necessary to pay a fixed communication fee in accordance with a total number of SIMs. In this case, the "total number of SIMs that are in a communicable condition" can be counted as follows.

(a) A maximum number of SIMs that can operate simultaneously per period, such as per month, day, time (comparatively long period).

(b) A maximum number of SIMs that can operate simultaneously per exceedingly short period, such as per second (comparatively short period).

The total number of SIMs may be decided by also including region parameters (range covered by a carrier-type LPWA base station, etc.) in addition to period settings such as the above (a) and (b). SIM allocation may be determined in accordance with the properties of device 10 (frequency of communication, generated data volume). For example, a SIM may be allocated with priority to device 10 when transmitting more detailed data about device 10 (temperature/humidity sensor data of an air conditioner per second), without allocating a SIM to device 10 when only sending a notification once a day to the appliance cloud about whether device 10 is operating.

(2) Concerning communication fees, there are cases in which a total data volume that passes through a communication network is charged and not the total number of SIMs.

(3) Concerning communication fees, there are cases in which there is a charge per ON/OFF state of the SIM.

It is necessary to be able to turn ON/OFF device 10 from a cloud system of the user. Instead of the above, it may also be possible to turn ON/OFF the SIM from device 10 when necessary. It is conceivable that turning ON/OFF the SIM incurs a small cost.

(4) Concerning communication fees, it is possible that there is a limit to how many times the SIM can be turned ON/OFF per fixed period regarding each terminal or all terminals of a subscriber.

A technical problem that arises when it is necessary to pay a fixed communication fee in accordance with the total number of SIMs that are in a communicable condition will be described next.

The following is a prerequisite. A first case is conceivable in which it is necessary to pay a fixed communication fee in accordance with the total number of SIMs in a communicable condition as a charging system of carrier-type LPWA SIMs, and a maximum number of SIMs that can operate is determined per fixed period, such a per month, week, day, or time.

It is conceivable to, for example, configure the maximum number of SIMs to be turned ON per period of time, as stated below, from a number of devices predicted to be operating per period of time, as a method for deciding the above maximum number of SIMs during the predetermined period.

(a) A low number of SIMs is allocated during the day on weekdays (i.e., time of day when many devices 10 are hardly operating in a household with two incomes).

(b) A high number of SIMs is allocated on weeknights (i.e., time of day when many devices 10 are operating).

(c) A high number of SIMs is allocated on weekends (many devices 10 are operating).

Note that it is conceivable to calculate operating conditions of such periods of time based on operating conditions of the device at the same periods of time in the past.

The total number of SIMs may vary depending on, for example, (i) parameters that influence whether or not to cause device 10 to operate, such as the past operating conditions and also the season and weather when device 10 is operating and the type of device 10, and (ii) the data volume that the user wants to transmit and receive differing per device 10, the immediacy of the data, and the like.

For example, when it is understood that there is a tendency for washing machines to be used more during the summer, more SIMs may be allocated to washing machines during summer weekends than winter weekends.

In this manner, by using the past operating conditions of device 10 and the causes (weather, etc.) influencing the operating conditions of device 10, it is possible to suitably configure the total number of SIMs that can operate simultaneously and minimize the cost of the total number of SIMs that are in a communicable state.

For example, in a case in which it is necessary to transmit a rotational frequency of the motor of an air conditioner or a value of an indoor/outdoor temperature sensor from the appliance to the appliance cloud at all times, without allocating a SIM (i.e., turning OFF the SIM and disabling usage of carrier-type LPWA) to a refrigerator when it is sufficient to only know the operating conditions of the refrigerator, the SIM of the air conditioner may be turned ON with priority.

The above condition leads to the problem that when device 10 and the appliance cloud communicate with each other, it is not only impossible to effectively use the allocated means of communication, but also to finish transmitting the generated data from device 10 to the appliance cloud in time, when device 10 does not communicate using carrier-type LPWA as much as possible, device 10 being allocated with a SIM that is in a communicable condition, i.e., device 10 being capable of communicating through carrier-type LPWA.

How the communication method may be switched from device 10 in the above charging system will be described next. This will be described below based on each communication channel.

Carrier-type LPWA is turned ON (SIM is ON) in a predetermined period of time and communication is possible (data transmission and reception is possible), and is turned OFF (SIM is OFF) outside of the predetermined period of time and communication is not possible (data transmission and reception is not possible).

Wi-Fi communication is possible when connection settings thereof have been configured.

Non-carrier-type LPWA communication is always possible, and is free of charge or exceedingly inexpensive compared to carrier-type LPWA even when being charged in accordance with the amount of communication traffic.

Figures 19, 20:
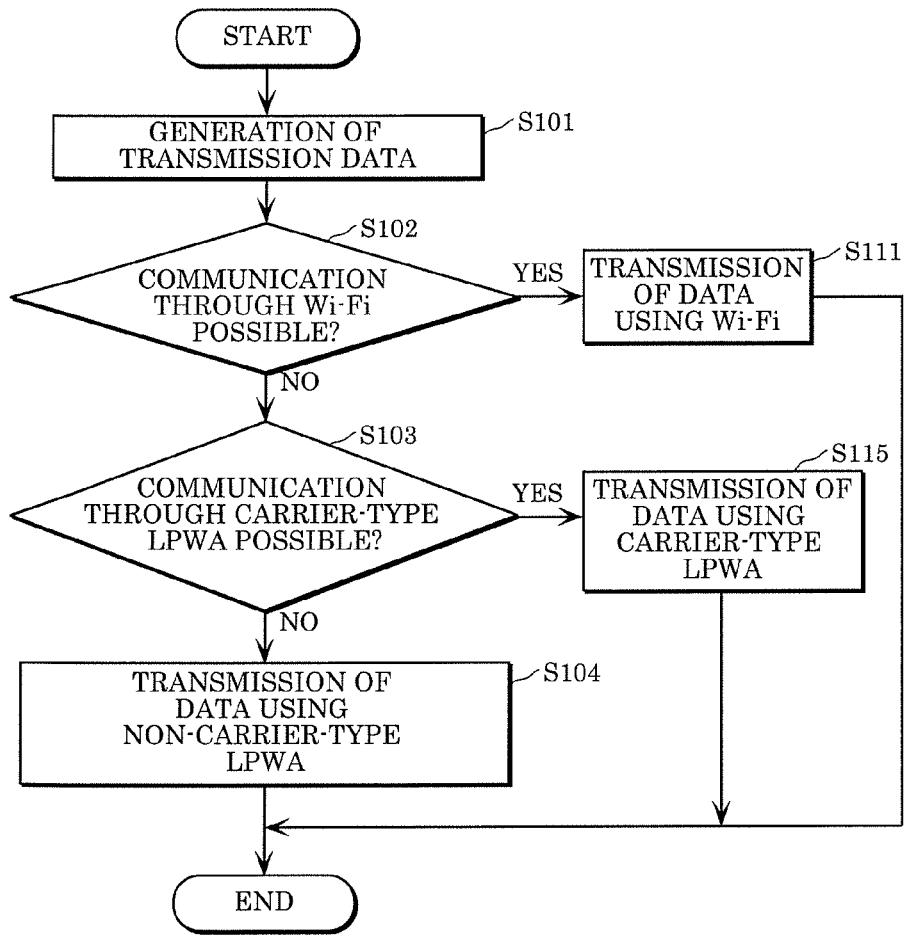
FIG. 19 is a flowchart showing a first example of a selection method of a communication method when a Wi-Fi connection is not possible.
FIG. 20 is an explanatory diagram showing a total number of available SIMs per predetermined time.

FIG. 19 is a flowchart showing a first example of a selection method of a communication method when a Wi-Fi connection is not possible. FIG. 19 is a flowchart showing which communication method to use to transmit data, when data is generated in device 10 to be transmitted to the appliance cloud. Note that FIG. 19 shows a process in which a communication module with a first index, i.e., higher communication stability, among long-distance communication modules included in device 10, communicates. Device 10 includes a short-distance communication module, and a process is also shown in which communication by the short-distance communication module is performed when communication by the short-distance communication module is possible.

As illustrated in FIG. 19, in device 10, when transmission data is generated (step S101), it is determined whether communication through Wi-Fi is possible (step S102). Device 10 stores a determination result as the communication availability information.

When it is determined that communication through Wi-Fi is not possible (NO in step S102), it is further determined whether communication through carrier-type LPWA is possible (step S103). Device 10 stores a determination result as the communication possibility information.

When it is determined that communication through carrier-type LPWA is not possible (NO in step S103), device 10 transmits data using non-carrier-type LPWA (step S104).

When it is determined that communication through Wi-Fi is possible (YES in step S102), device 10 transmits data using Wi-Fi (step S111).

When it is determined that communication through carrier-type LPWA is possible (YES in step S103), device 10 transmits data using carrier-type LPWA (step S115).

Note that this is not illustrated in the flowchart of FIG. 19, but when the validity period of the carrier-type LPWA communication expires during the "TRANSMISSION OF DATA USING CARRIER-TYPE LPWA", (a) the validity period of the SIM may be extended (e.g., until the data that was being transmitted until 15:00 has finished transmitting, or until a predetermined time such as 15:05), and (b) return once more to "COMMUNICATION THROUGH Wi-Fi POSSIBLE?" in the flowchart, and the remaining data may be transmitted using Wi-Fi or non-carrier-type LPWA, by checking through which communication channel communication is possible.

In this manner, when a communication fee occur because of the total number of SIMs that can be used per predetermined period of time, it is possible to communicate with faster communication speed at the same cost (total number of available allocated SIMs), by using carrier-type LPWA as long as it is possible to communicate through carrier-type LPWA, without having to use non-carrier-type, which has slower communication speed, whenever possible.

This is not illustrated in the flowchart of FIG. 19, but the moment communication through Wi-Fi becomes possible, the total number of SIMs in a communicable condition may be reduced, by switching OFF the SIMs, and the total number of SIMs in a communicable condition may also be maintained at a fixed number, by turning ON the SIMs of other devices 10 whose SIM is turned OFF, even when the SIMs allocated to carrier-type LPWA are turned ON.

For the above extension of the period of the SIMs that are in the ON state, extension permission may be requested from the cloud accommodating carrier-type LPWA, and a extendible time may be predetermined per device or period of time.

Note that in the flowchart, "COMMUNICATION THROUGH CARRIER-TYPE LPWA POSSIBLE?" may be determined in the ON/OFF states of the carrier-type LPWA SIM; and communication through carrier-type LPWA may also be determined to be possible by turning ON the SIM, when the total number of SIMs is not exhausted after inquiring with the cloud accommodating carrier-type LPWA or the appliance cloud whether a permissible total number of SIMs is exhausted within a predetermined time.

The SIMs may be turned ON/OFF by device 10 in accordance with a table such as the table in FIG. 20. The table may be updated including the periods of time from the past operating conditions of device 10 understood by the appliance cloud or the total number of SIMs.

A method for minimizing the total number of SIMs to be turned ON within a household will be described next. A case in which the user is charged in accordance with the total number of SIMs simultaneously operating, such as the above-mentioned charging system, is discussed.

Figure 21:
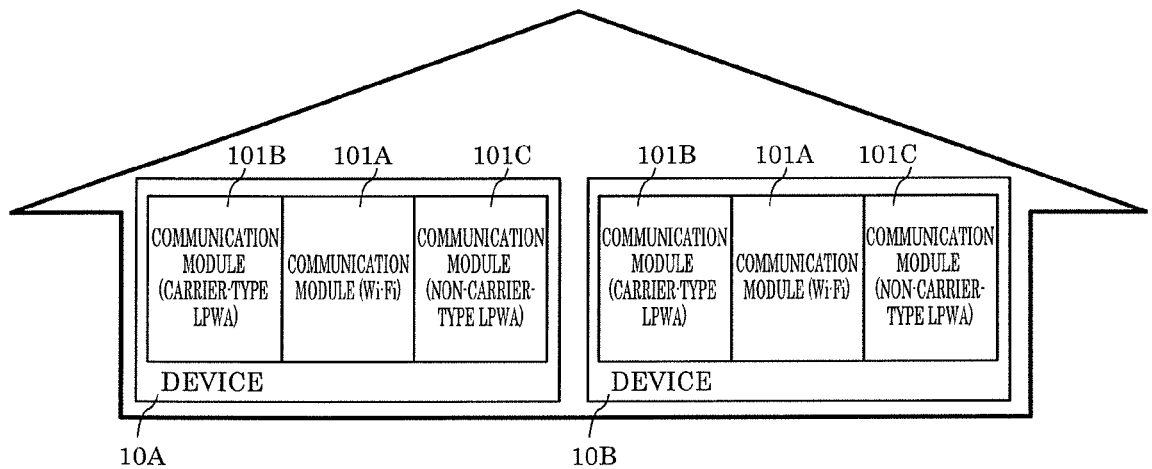
FIG. 21 is a first explanatory diagram showing a configuration that minimizes a total number of SIMs used in a household.

As illustrated in FIG. 21, for example, a case is conceivable in which one house has two devices 10A and 10B, and devices 10A and 10B each include the carrier-type LPWA communication module, the Wi-Fi communication module, and the non-carrier-type LPWA communication module. For example, device 10A has device ID 0001 and device 10B has device ID 0002.

When the carrier-type LPWA of both devices 10A and 10B is capable of communicating (SIMs are in the ON state), a charge is incurred for two SIMs. A method for avoiding being charged for two SIMs will be described. The following conditions are assumed for the sake of description.

(a) Both devices 10A and 10B are not connected to the appliance cloud using Wi-Fi (there is no need to use LPWA when the devices are connected to the appliance cloud with Wi-Fi).

(b) The carrier-type LPWA of device 10A can communicate (SIM is in the ON state), and the carrier-type LPWA of device 10B cannot communicate (SIM is in the OFF state).

(c) The non-carrier-type LPWA of both devices 10A and 10B can communicate.

In a case in which device 10B wants to transmit data to the appliance cloud, it was normally only possible to (i) transmit the data at an exceedingly low speed using non-carrier-type LPWA, or (ii) turn ON the SIM of device 10B and use carrier-type LPWA, when the communication speed of non-carrier-type LPWA was too slow to use.

Incidentally, devices 10A and 10B have communication functionality through Wi-Fi, but a connection called ad hoc mode is possible, as a part of the functionality of Wi-Fi, in which two devices are directly connected to each other.

Figure 22:
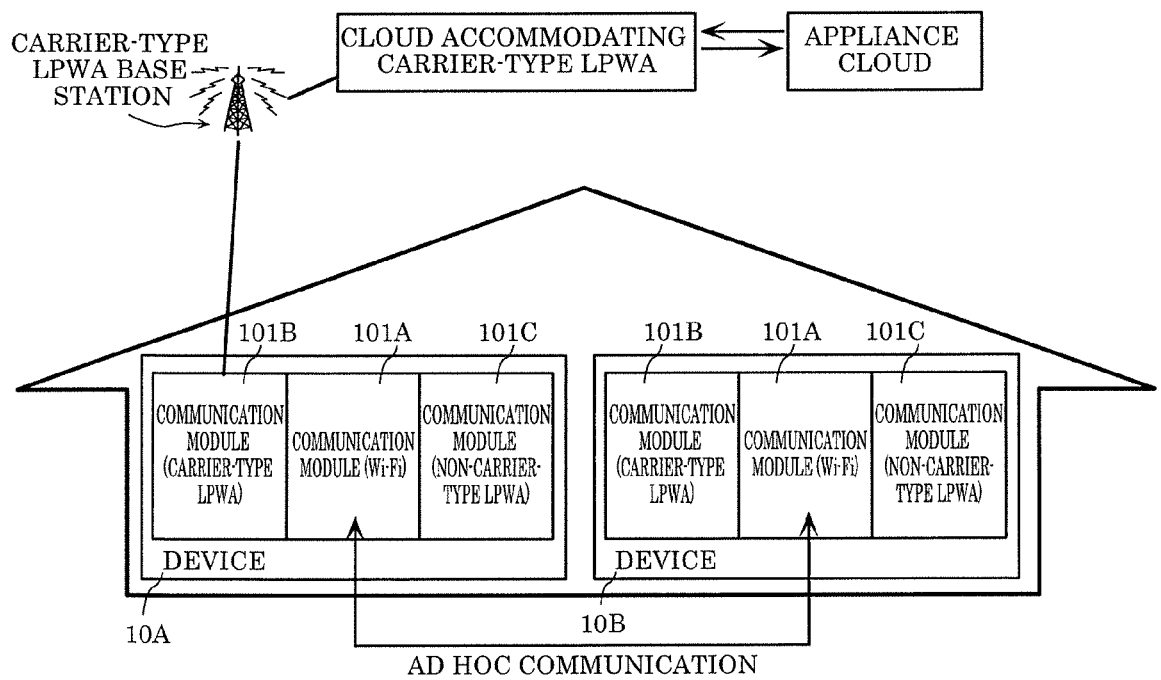
FIG. 22 is a second explanatory diagram showing a configuration that minimizes the total number of SIMs used in a household.

FIG. 22 is a second explanatory diagram showing a configuration that minimizes the total number of SIMs used in a household. As illustrated in FIG. 22, connecting devices 10A and 10B to each other in the ad hoc mode is implemented by making three values (1) Extended Service Set Identifier (ESSID) (or Service Set Identifier (SSID)), (2) wireless channel, and (3) Wired Equivalent Privacy (WEP) (encryption key) of the Wi-Fi of devices 10A and 10B the same. In this manner, by connecting device 10A and device 10B to each other through the ad hoc mode of the Wi-Fi, device 10B can communicate with the appliance cloud via device 10A. Since only one SIM needs to be turned ON with such a connection configuration, it is possible to reduce costs proportionate to the total number of SIMs to be turned ON.

Figure 23:
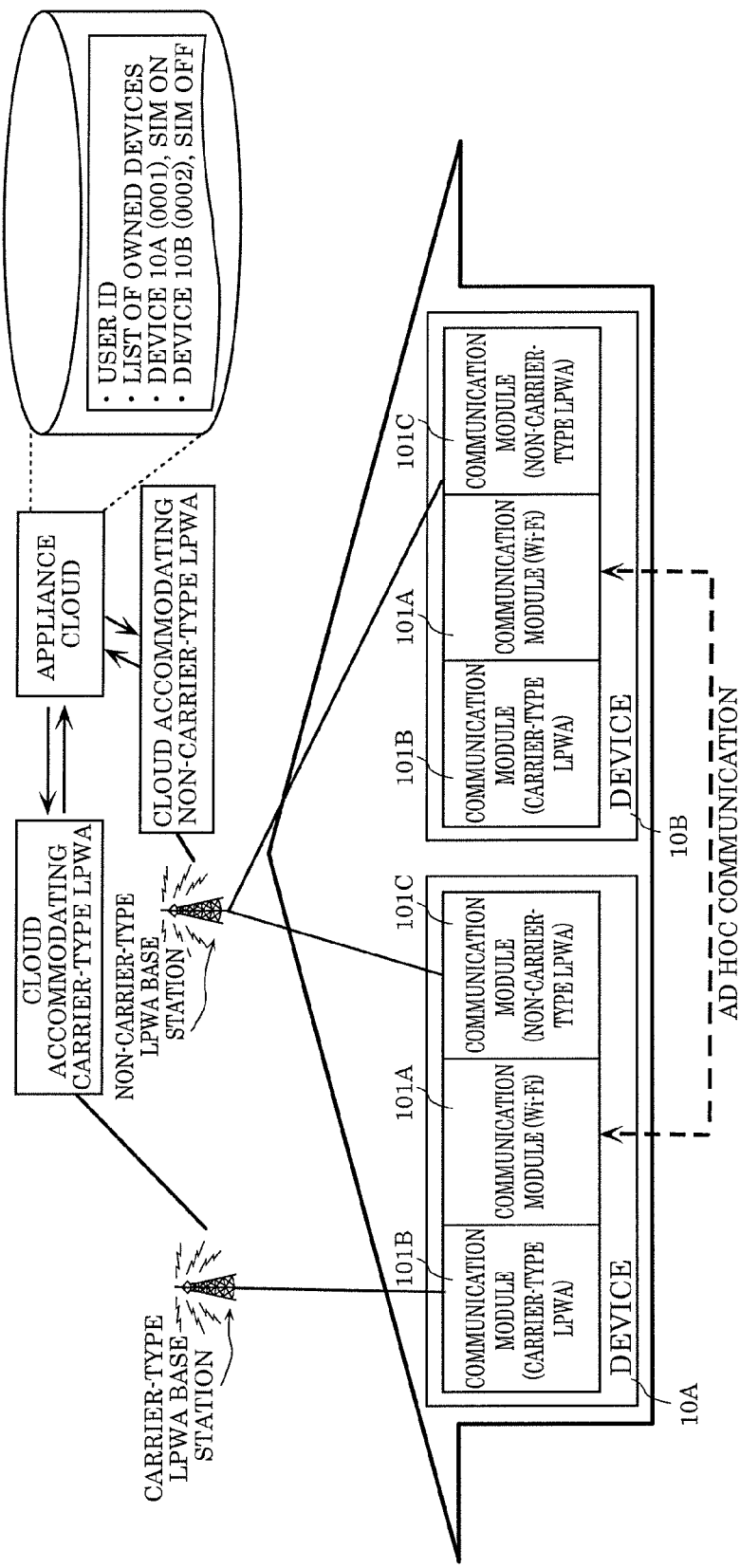
FIG. 23 is a third explanatory diagram showing a configuration that minimizes the total number of SIMs used in a household.
Figure 24:
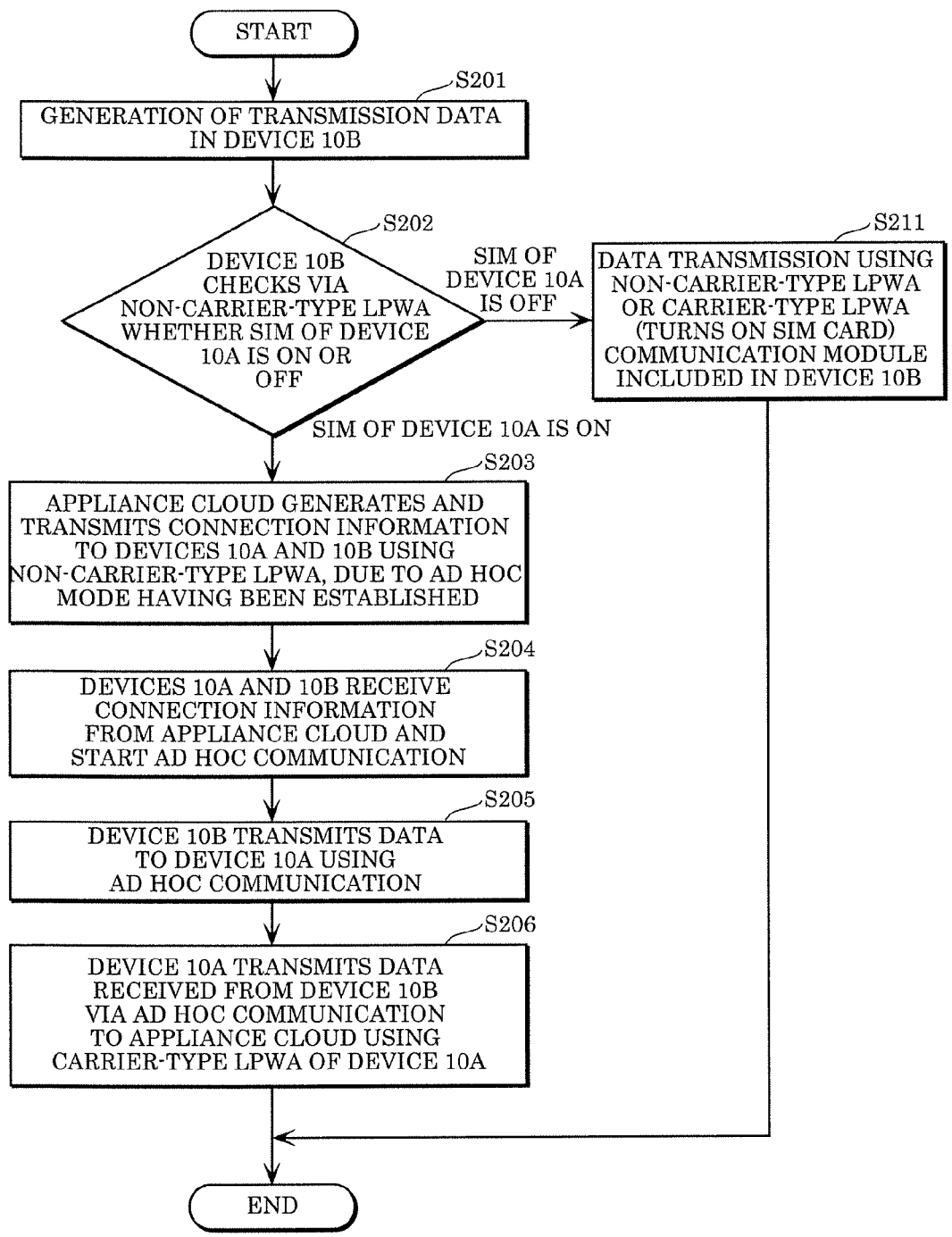
FIG. 24 is a flowchart showing a process for minimizing the total number of SIMs used in a household.

FIG. 23 is a third explanatory diagram showing a configuration that minimizes the total number of SIMs used in a household. FIG. 24 is a flowchart showing a process for minimizing the total number of SIMs used in a household.

How to establish Wi-Fi ad hoc communication between devices 10A and 10B when device 10B wants to communicate, as stated above, will be described.

As illustrated in FIG. 24, data to be transmitted (transmission data) is generated in device 10B in step S201. As such, device 10B checks via non-carrier-type LPWA whether the SIM of device 10A in the same household is in the ON or OFF state (step S202).

When the SIM of device 10A is ON ("SIM OF DEVICE 10A IS ON" in step S202), the appliance cloud generates and transmits the connection information below to devices 10A and 10B using non-carrier-type LPWA, due to the ad hoc mode having been established (step S203). The connection information includes an ESSID (or SSID), a wireless channel, and a WEP (encryption key).

Devices 10A and 10B receive the connection information transmitted by the appliance cloud, are directly connected to each other in the ad hoc mode using the received connection information, and start ad hoc communication (step S204).

Device 10B transmits the data generated in step S201 to device 10A using the ad hoc communication (step S205).

Device 10A transmits the data received from device 10B via the ad hoc communication in step S205 to the appliance cloud using the carrier-type LPWA of device 10A (step S206).

When the SIM of device 10A is OFF ("SIM OF DEVICE 10A IS OFF" in step S202), device 10B transmits the data using the non-carrier-type LPWA or carrier-type LPWA communication module included in device 10B. Note when the above transmission is necessary, the SIM of the communication module to be used is turned ON.

In this manner, in the appliance cloud, when it is confirmed that devices 10A and 10B are in the same house, the ad hoc communication between devices 10A and 10B is established using the connected means of communication (in FIG. 23, non-carrier-type LPWA), and the data transmission (reception also possible) of device 10B is performed using the carrier-type LPWA of device 10A via the ad hoc communication.

By doing so, it is possible to reduce costs when charging in accordance with the total number of SIMs, since it is not necessary to turn ON the SIM of device 10B.

Note that non-carrier-type LPWA is used to establish the ad hoc communication, but when, for example, devices 10A and 10B also include Bluetooth® communication functionality, an ad hoc connection may also be established by establishing a connection between a smartphone and devices 10A and 10B using the Bluetooth functionality of the smartphone and obtaining an ESSID and the like from the appliance cloud via a smartphone.

Device 10A may also obtain information necessary to establishing the ad hoc mode from the appliance cloud using carrier-type LPWA. In this manner, since it is possible to narrow down the carrier-type LPWA networks used for the transmission and reception by multiple devices to one network in the same house, it becomes possible to limit the number of appliances that the carrier-type LPWA network accommodates, and to avoid signal interference due to accommodating too many devices.

A technical problem when a total volume of data passing through a communication network is charged will be explained next.

The following is a prerequisite. A case is conceivable in which any number of SIMs may be used, but the total volume of data passing through the communication network is charged, as the charging system of carrier-type LPWA SIMs.

Figure 25:
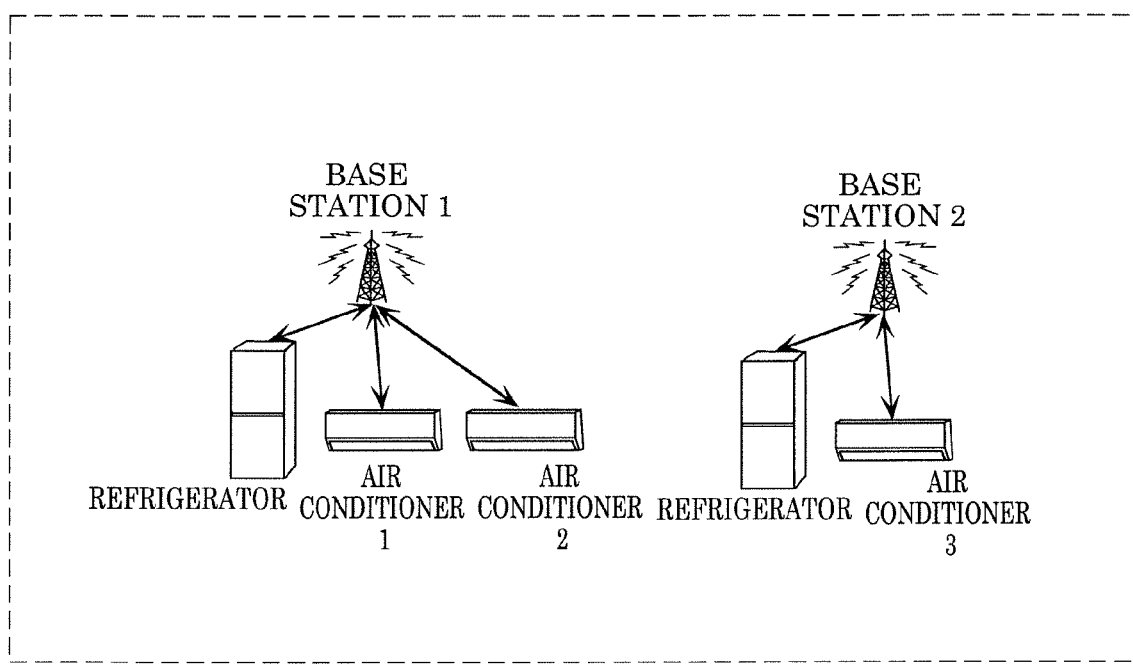
FIG. 25 is an explanatory diagram showing a selection method of a communication method when a Wi-Fi connection is not possible.

The total volume of the data may be approached per base station, as illustrated in FIG. 25. For example, data volume changes depending on the total number of devices accommodated per base station or properties of the data, such as 500 kB in one month between the devices accommodated by base station 1 and 200 kB in one month between the devices accommodated by base station 2, but a total volume of data per base station may also be used, such as a usage fee of base station 1 being ¥10,000 and a usage fee of base station 2 being ¥5,000. A total sum of the data volume of the communication performed with the devices accommodated by all base stations may also be used, without using the concept of base stations.

A technical problem in this case is as follows. The more communication functionality is used with carrier-type LPWA, the more communication fees are required. When using non-carrier-type LPWA with priority in order to limit fees, there is the problem of a response time of an app managing the device decreasing, delays in the appliance cloud being notified that an appliance is malfunctioning, and the like caused by the slow communication speed of non-carrier-type LPWA. To be specific, when it is necessary to notify the appliance cloud that an appliance is malfunctioning in the case of an emergency, such as the device malfunctioning, there is the problem that contacting customer support of the device or the user of the appliance detecting the malfunction, which requires time, is delayed.

Therefore, it is necessary to suitably select a communication method to be used, depending on the data volume and urgency of data to be transmitted (by when the data needs to be transmitted) to the cloud from the appliance.

How the communication method may be switched from device 10 in the above charging system will be described next. This will be described below based on each communication channel.

Carrier-type LPWA communication is always possible, and is charged in accordance with communication fees.

Wi-Fi communication is possible when connection settings thereof have been configured.

Non-carrier-type LPWA communication is always possible, and is free of charge or charged in accordance with communication fees. However, non-carrier-type LPWA is exceedingly inexpensive compared to carrier-type LPWA.

Figure 26:
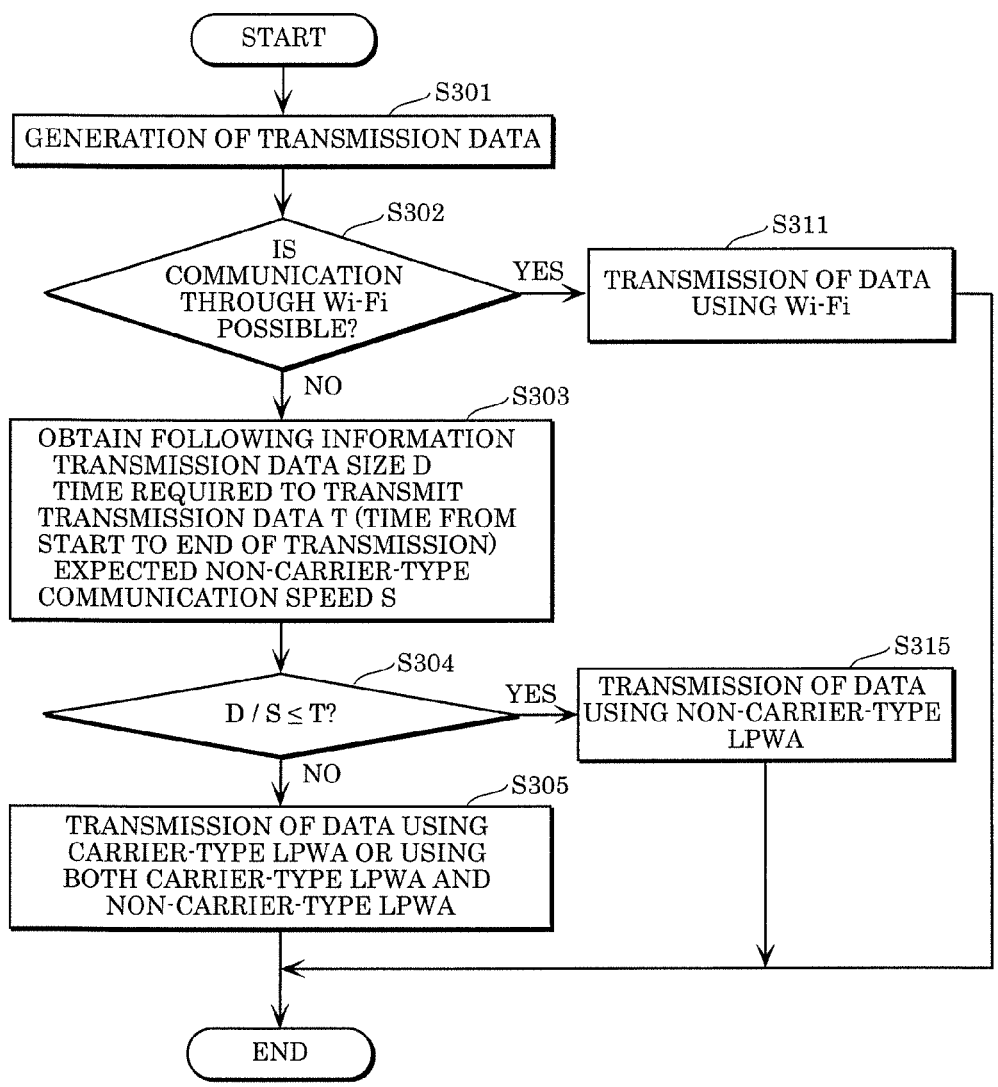
FIG. 26 is a flowchart showing a second example of a selection method of a communication method when a Wi-Fi connection is not possible.

FIG. 26 is a flowchart showing a second example of a selection method of a communication method when a Wi-Fi connection is not possible. More specifically, FIG. 26 is a flowchart showing which communication method to use to transmit data, when data to be transmitted to the appliance cloud is generated in device 10. Note that FIG. 26 shows a process in which, among the plurality of long-distance communication modules included in device 10, a communication module with a second index, i.e., slower communication speed, or a communication module with a third index, i.e., lower communication fees communicates. A process is also shown in which another communication module is assigned, when a communication time using the assigned communication module is comparatively long.

As illustrated in FIG. 26, data to be transmitted (transmission data) is generated in device 10 in step S301. As such, device 10 checks whether communication through Wi-Fi is possible, i.e., determines whether communication through Wi-Fi is possible (step S302). Device 10 stores a determination result as the communication possibility information.

When it is determined that communication through Wi-Fi is not possible (NO in step S302), device 10 obtains the following information (step S303). The information obtained by device 10 is transmission data size D, time required to transmit transmission data (time from start to end of transmission) T, and expected non-carrier-type communication speed S.

Next, device 10 determines whether the time required to transmit the transmission data (D/S) is contained within time required to transmit transmission data T, i.e., whether time D/S is equal to or less than time T (whether D/S≤T holds true) (step S304).

When it is determined that time D/S is not equal to or less than time T (NO in step S304), device 10 transmits the data generated in step S301 using carrier-type LPWA (step S305). Note that at this point, the data may be transmitted using both carrier-type LPWA and non-carrier-type LPWA.

When it is determined that time D/S is equal to or less than time T (YES in step S304), device 10 transmits the data generated in step S301 using non-carrier-type LPWA (step S315).

When it is determined that communication through Wi-Fi is possible in step S302 (YES in step S302), device 10 transmits data using Wi-Fi (step S311).

Note that this is not illustrated in the flowchart of FIG. 26, but when "D'/S'>T'" holds true during "TRANSMISSION OF DATA USING NON-CARRIER-TYPE LPWA" with regard to actual communication speed S', untransmitted data volume D', and remaining time required to finish transmission T', communication may be switched to carrier-type LPWA midway since the data transmission will not finish in time T anyway.

In this manner, it is possible to reduce usage time of carrier-type LPWA, which incurs costs (communication traffic) and to reduce communication fees, by using the size of the data to be transmitted, the time required to transmit the transmission data, the expected communication speed of the non-carrier-type LPWA, and transmit data using non-carrier-type LPWA as much as possible.

The past communication speed stored in device 10 may be used for expected non-carrier communication speed S. Communication speeds at times, such as the same day time of day or the same day in the past, when the non-carrier-type LPWA is believed to be used similarly may be stored and used.

Device 10 may be configured to detect whether communication through a Wi-Fi connection is possible as required even during non-carrier-type LPWA or carrier-type LPWA communication, stop the non-carrier-type LPWA and carrier-type LPWA communication when communication through a Wi-Fi connection becomes possible, and change to communication using Wi-Fi. Doing so makes it possible to smoothly change the communication method to Wi-Fi, also when a temporarily stopped Wi-Fi access point becomes available again.

When the cost required for communication through carrier-type LPWA (communication fee) is a fixed fee up until a predetermined data volume, communication may be performed via carrier-type LPWA until the predetermined data volume is reached, regardless of the values of D, T, and S.

When wanting fast communication regardless of the values of D, T, and S (error notification pertaining to a hazard, etc.), a means of communication to be used may be assigned as one property of the generated data. For example, in the case of an error notification pertaining to a hazard, using carrier-type LPWA may be made necessary as the means of communication, regardless of the values of D, T, and S.

A technical problem of the life cycle of always-connected IoT appliances that simultaneously use the two LPWA communication modules and the Wi-Fi communication module will be described next.

Figure 27:
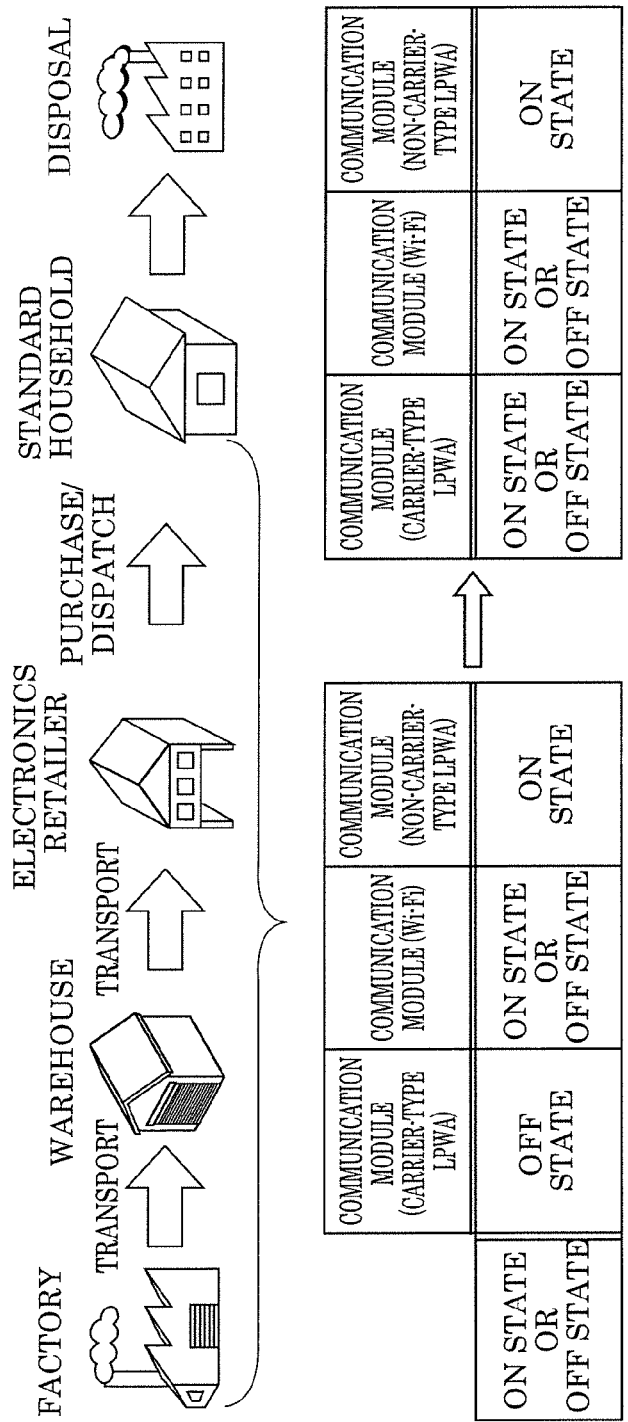
FIG. 27 is an explanatory diagram showing a life cycle of IoT appliances.

FIG. 27 is an explanatory diagram showing the life cycle of IoT appliances.

It is possible to manage device 10 throughout the life cycle of device 10 from being manufactured in a factory to disposal, by suitably using the three means of communication, carrier-type LPWA, non-carrier-type LPWA, and Wi-Fi. When turning ON a means of communication that incurs a communication fee, i.e., the carrier-type LPWA SIM, there is, for example, the advantage of being able to remotely control device 10 set up in a standard household, since it is possible to transmit data between device 10 and the appliance cloud, but there is the problem of communication fees being incurred and the like when the carrier-type SIM is turned ON when not needed.

(1) In most cases, final products or communication modules are tested by being energized in a factory.

At this time, it is possible that a communication fee is incurred or a SIM is charged, when the carrier-type LPWA SIM is turned ON. However, it is preferred that the means of communication at the time of manufacturing in the factory are initially configured as follows: (a) carrier-type LPWA SIM is OFF, (b) Wi-Fi is ON or OFF, and (c) non-carrier-type LPWA is ON.

Since it is possible to obtain positional information of device 10 through non-carrier-type LPWA (LoRa) technology by turning ON carrier-type LPWA in advance, it is also possible to automatically record, in the appliance cloud, the initial stage of the life cycle of device 10, i.e., the date of manufacture, by transmitting the location, data and time where device is energized for the first time, i.e., when shipped from the factory, from device 10 to the appliance cloud and recording this information in the appliance cloud.

(2) From factory to warehouse, from warehouse to electronics retailer, from electronics retailer to standard household.

It is preferred that (a) carrier-type LPWA SIM is OFF, (b) Wi-Fi is ON or OFF, and (c) non-carrier-type LPWA is ON.

Through such settings, it is possible to know transportation route conditions and accurate stock conditions of a warehouse using non-carrier-type position obtainment functionality, when device 10 includes a battery. Even device 10 does not include a battery, it is possible to know the position and the like of device 10, when energizing device 10 for factory inspection or an in-store demonstration in the electronics retailer.

(3) Electronics Retailer

When a storefront is detected (when it is understood that the device is operating in the storefront demonstration mode and is located in a retailer using the positional information of the non-carrier-type LPWA, etc.), it is preferred that (a) carrier-type LPWA SIM is OFF, (b) Wi-Fi is ON or OFF, and (c) non-carrier-type LPWA is ON.

(4) In a household, the carrier-type SIM may remain OFF, when a Wi-Fi connection is set up. When a Wi-Fi connection is not set up, the user may be prompted to turn ON carrier-type LPWA, test the IoT appliance, and change to Wi-Fi, as described later.

(5) When the device is detected to be disposed (user has registered device as disposed, device has not been used for a long period, etc.), it is preferred that the carrier-type LPWA SIM is turned OFF.

As stated above, in order to limit carrier-type LPWA communication fees when device 10 is shipped from the factory until device 10 is delivered to a standard household, it is preferred that (a) carrier-type LPWA SIM is OFF, (b) Wi-Fi is ON or OFF, and (c) non-carrier-type LPWA is ON. However, when device 10 is set up in a standard household in this state, only non-carrier-type LPWA is available as a means of communication, as long as a Wi-Fi connection is not established. Thus, since there is the technical problem of the data volume that can be transmitted and received being exceedingly low, communication speed being slow, and the like, there is also a technical problem of not being able to receive services by connecting the IoT appliance (remote operation of device, understanding state of device, malfunction notification based on state log of device, etc.).

In this case, since the user cannot enjoy the full functionality of the IoT appliance and experience the value of the IoT appliance, there is a high possibility that the user will subsequently not try setting up a Wi-Fi connection either.

In order to solve this, when a Wi-Fi connection has not been set up after setting up the device in a standard household, it is preferred to turn ON the carrier-type SIM under a predetermined condition, and first allow the user to know the convenience and value of the IoT appliance. In order the implement this, after device 10 has been set up in a standard household, the UI or manual of device 10 encourages the user to set up a Wi-Fi connection.

Figure 28:
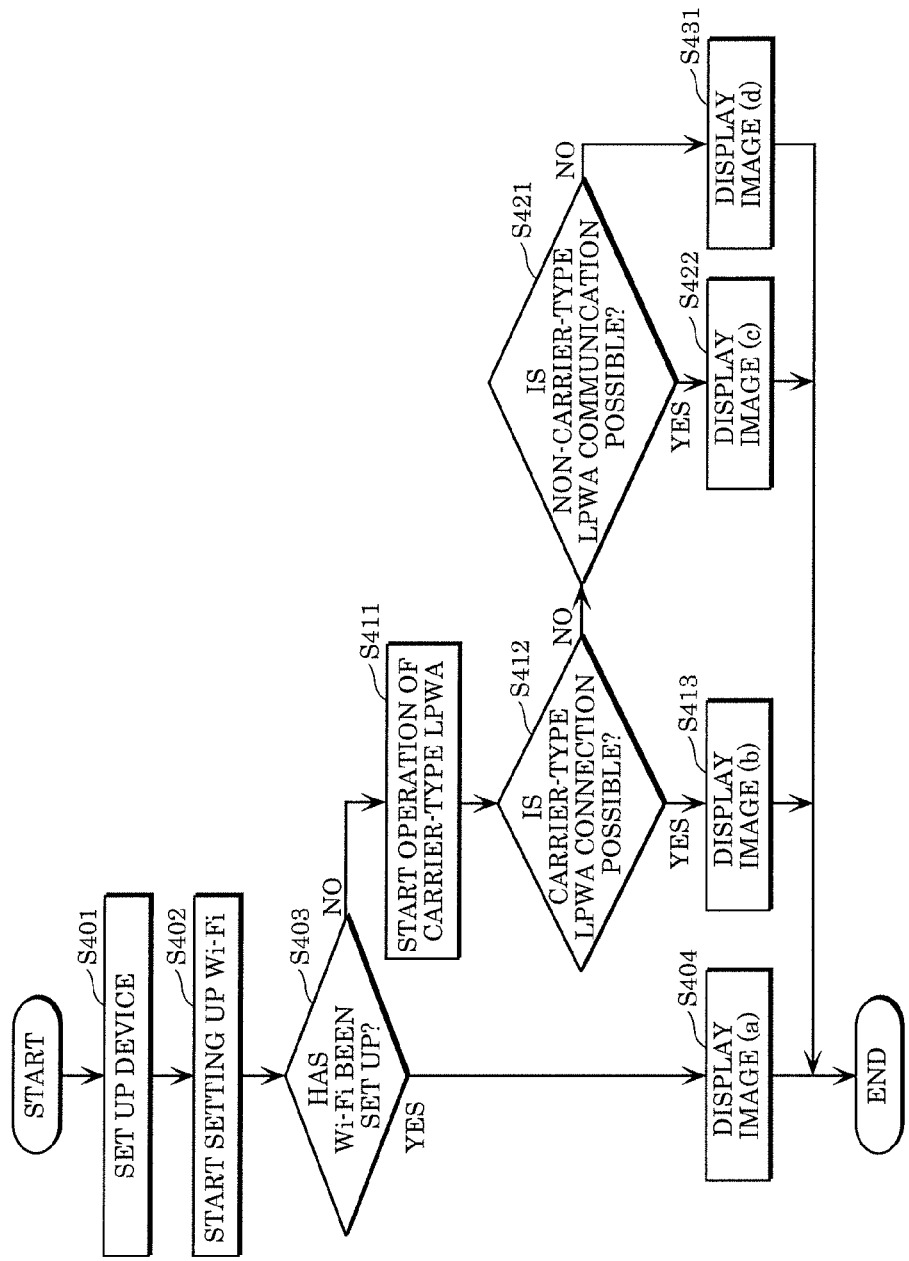
FIG. 28 is a flowchart showing a process of connecting communication modules and selecting a UI image.
Figure 29:
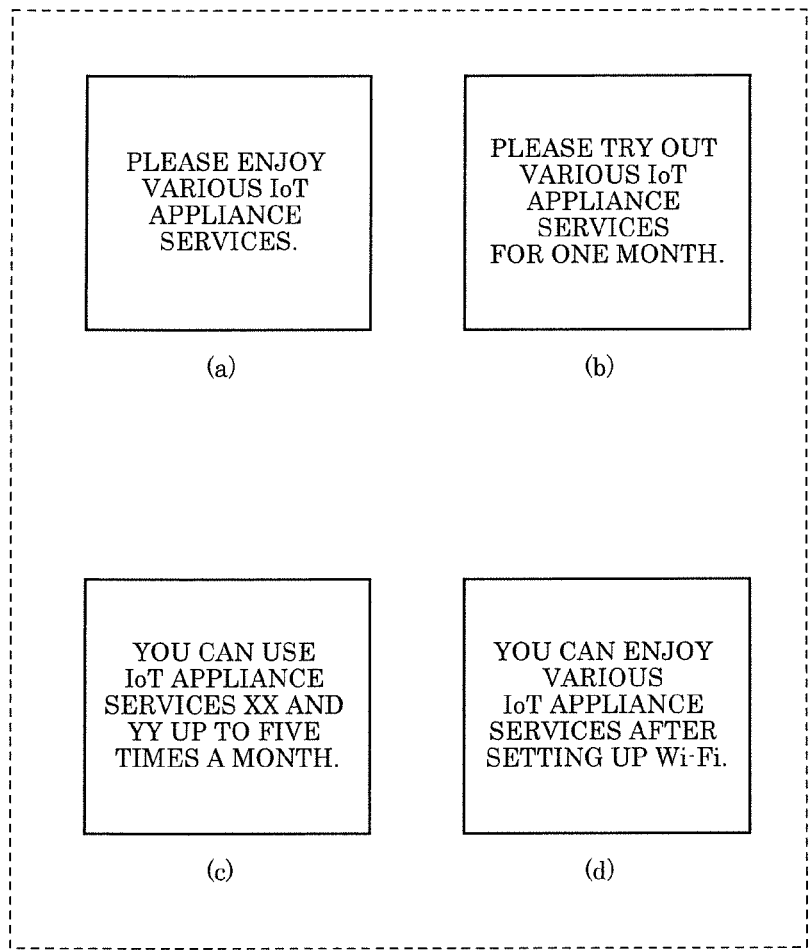
FIG. 29 is a first explanatory diagram showing a UI image that is displayed on a display screen by the device.

FIG. 28 is a flowchart showing a process of connecting a communication module and selecting a UI image. FIG. 29 is a first explanatory diagram showing the UI image that is displayed on a display screen by device 10.

When device 10 is set up (step S401), the carrier-type LPWA SIM configured to be OFF and the Wi-Fi communication module is configured to be OFF. In other words, the carrier-type LPWA and Wi-Fi communication modules are not operating. The SIM of the non-carrier-type LPWA communication module is turned ON.

Device 10 receives information necessary to communication through Wi-Fi from the user, i.e., the user starts setting up the Wi-Fi (step S402).

Subsequently, device 10 receives the information necessary to communication through Wi-Fi, i.e., determines whether the Wi-Fi has been set up (step S403). To be specific, determiner 10 determines whether the above settings have been configured, by determining whether the information received in step S402 satisfies a condition indicating that the information is sufficient for a communication connection (corresponds to first connection) using Wi-Fi.

For example, device 10 determines whether the information received in step S402 includes (1) an ESSID (or SSID), (2) a wireless channel, (3) a WEP (encryption key), and the like in the communication through Wi-Fi.

Note that the above determination may be implemented by, for example, activating the Wi-Fi module and determining whether the connection is actually established and the communication is actually performed through the Wi-Fi communication module, based on the information received in step S402.

When it is determined that Wi-Fi has been set up (YES in step S403), display 112 displays image (a) (see FIG. 29) (step S404).

In this manner, when a Wi-Fi connection has been set up, the user can enjoy the full functionality of the IoT appliance. Device 10 displays a message such as image (a) on the display of device 10 or the screen of a smartphone app that is separately linked to device 10.

When it is determined that Wi-Fi has not been set up (NO in step S403), device 10 causes carrier-type LPWA to start operating (step S411). When it is determined that a carrier-type LPWA connection (corresponds to a third connection) is possible (YES in step S412), display 112 displays image (b) (see FIG. 29) (step S413).

In other words, when there is no Wi-Fi access point or a Wi-Fi connection has not been established even when there is an access point, device 10 checks whether a carrier-type LPWA connection is possible (whether device 10 is in a communication area, i.e., whether it is possible to connect device 10 to a base station). When carrier-type LPWA communication is possible (SIM is ON), the user can use the communication speed and stability of carrier-type LPWA and be provided with the full functionality of the IoT appliance, by, for example, limiting a period or a use count thereof as illustrated in image (b). This enables the user to test the value of the IoT appliance. Limiting the period, use count, or functionality is for avoiding recurring communication fees caused by carrier-type LPWA.

When it is determined that a carrier-type LPWA connection is not possible (NO in step S412) and a non-carrier-type LPWA connection (corresponds to a second connection) is possible (YES in step S421), display 112 displays image (c) (see FIG. 29) (step S422).

In other words, when a carrier-type LPWA connection is not possible, device 10 checks whether a non-carrier-type LPWA connection is possible (checks whether device 10 is in the communication area). When non-carrier-type LPWA communication is possible, available services within the limitations of non-carrier-type LPWA (communication speed, capacity, etc.) are presented, such as in image (c).

When non-carrier-type LPWA communication is not possible (NO in step S412), display 112 displays image (d) (see FIG. 29) (step S431).

In other words, in a case in which non-carrier-type LPWA communication is also not possible, a UI image is displayed prompting to connect through Wi-Fi, as shown in image (d).

When steps S404, S412, S422, and S431 are finished, the process sequence shown in FIG. 28 ends.

In this manner, even when a Wi-Fi connection has not been established, it is possible for the user to test the full functionality of the IoT appliance, by activating carrier-type LPWA (turn ON the SIM) for a limited period, limited use count, or with restricted functionality.

How to cause a user, who has been using restricted functionality for a limited period and a predetermined use count with carrier-type LPWA in a standard household during the life cycle of always-connected IoT appliances that simultaneously use the two LPWA communication modules and the Wi-Fi communication module, to switch to Wi-Fi will be described next.

Figure 30:
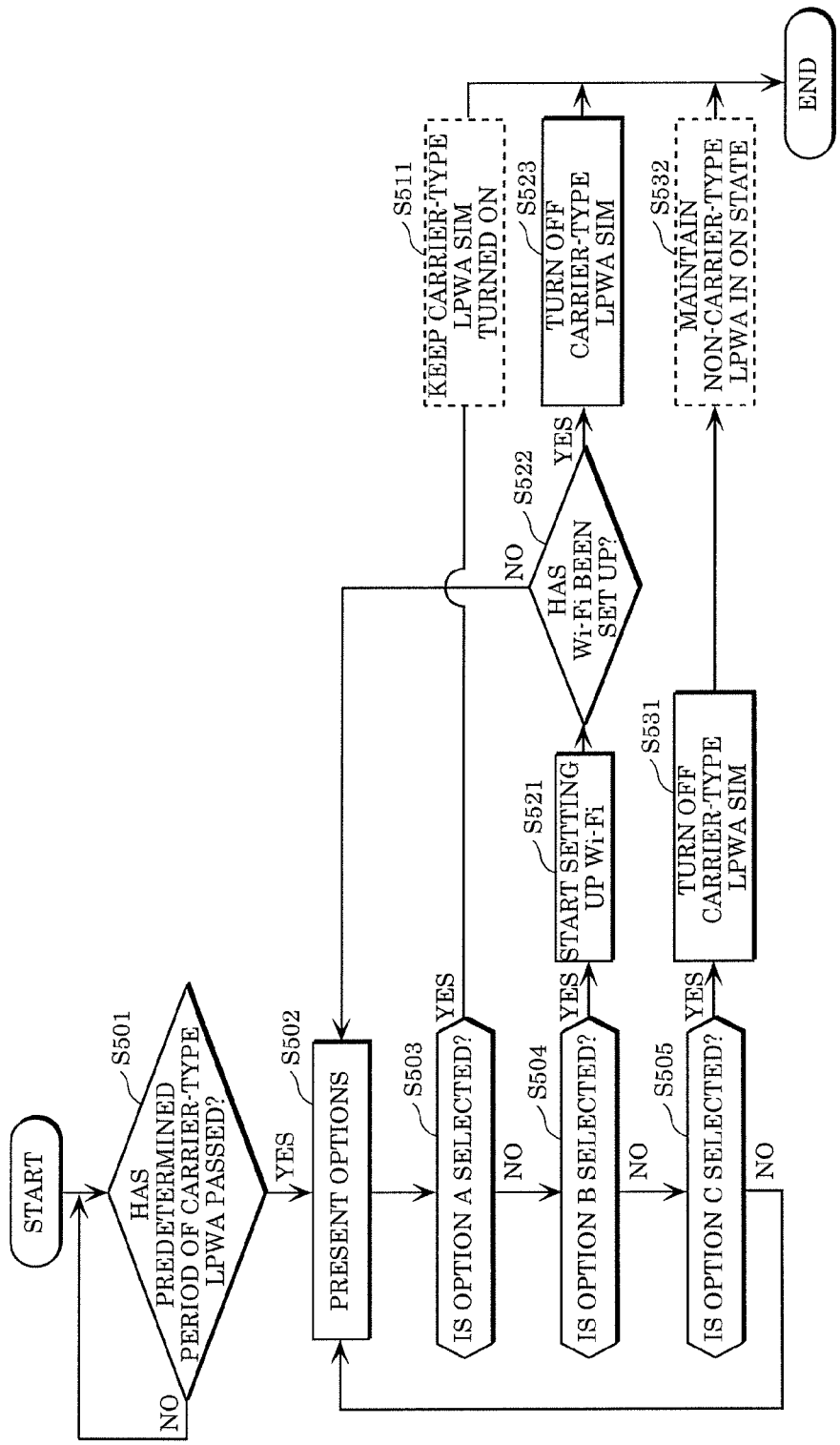
FIG. 30 is a flowchart showing a process according to operation control of the communication modules.
Figure 31:
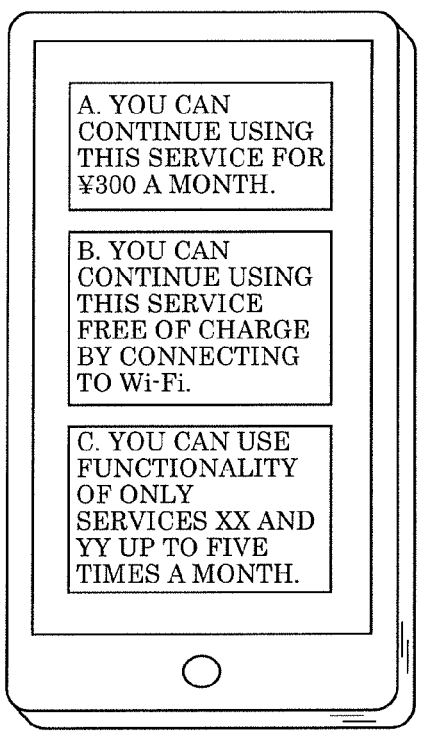
FIG. 31 is a second explanatory diagram showing a UI image that is displayed on the display screen by the device.

FIG. 30 is a flowchart showing a process related to operation control of the communication modules. FIG. 31 is a second explanatory diagram showing an UI image that is displayed on the display screen by device 10.

A technical problem is as follows. As stated above, the user is allowed to the use the functionality of the IoT appliance, by imposing restrictions on the carrier-type LPWA (period, number count, functionality, etc.), when a Wi-Fi connection has not been established after setting up device 10, in order to allow the user of device 10 to use the full functionality of the IoT appliance and experience the value of the IoT appliance.

However, there is a technical problem of recurring communication fees of the carrier-type LPWA, when the user keeps using the carrier-type LPWA.

A solution to the technical problem is as follows. The user that has tested the functionality of the IoT appliance by using carrier-type LPWA is presented with a UI image showing a "menu to switch from carrier-type LPWA" when a predetermined period has passed or a predetermined use count has been used up. At this point, it is possible to prompt the user to switch to Wi-Fi, by presenting at least two options, such as an option showing "continue using IoT functionality free of charge by connecting to Wi-Fi" and an option showing "continue using IoT functionality without connecting to Wi-Fi by paying a fixed monthly fee".

To be specific, device 10 determines whether a predetermined period has passed since causing the carrier-type LPWA to start operating (step S501), and presents a selection of the communication modules, to be specific, displays an image showing options A, B, and C (see FIG. 31) on the display screen, when it is determined that the predetermined period has passed.

When option A is selected (YES in step S503), device 10 maintains the carrier-type LPWA SIM in the ON state (step S511).

In a case in which the user is experiencing the value of the functionality of the IoT appliance when using carrier-type LPWA, it is possible to get the user to continue using the functionality of the IoT appliance even when being charged, also in a case in which the user does not establish a Wi-Fi connection. In this case, there is the advantage of the appliance manufacturer no longer having to be responsible for any communication fees, since the user becomes responsible for any carrier-type LPWA communication fees. In such a case, option A may be selected.

When option B is selected (YES in step S204), device 10 starts setting up Wi-Fi (step S521), and when Wi-Fi has been set up (YES in step S522), device 10 turns OFF the carrier-type LPWA SIM (step S523).

When option C is selected (YES in step S505), device 10 turns OFF the carrier-type LPWA SIM (step S531). At this point, since the non-carrier-type LPWA SIM is maintained in the ON state (step S532), communication with the server through non-carrier-type LPWA communication is possible. Option C can be said to be an option narrowing down the functionality that can be implemented by non-carrier-type LPWA for a user that does not set up a Wi-Fi connection, does not want to be charged for use the functionality of the IoT appliance through carrier-type LPWA.

In this manner, device 10 displays the image on the display screen that prompts the user to use any of the plurality of communication modules as one communication module used for a connection between device 10 and the server, when a predetermined period has passed since using carrier-type LPWA. Device 10 causes the above one communication module to start operating or continue operating, upon receiving an instruction from the user to use the one communication module.

Figure 32:
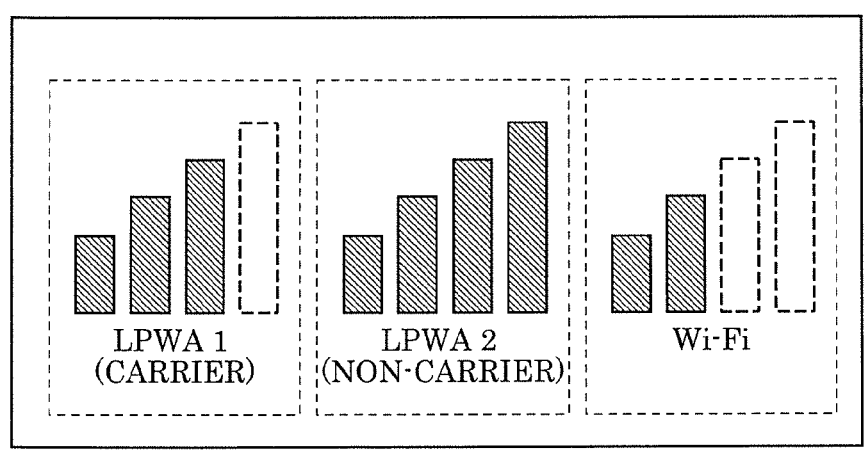
FIG. 32 is an explanatory diagram of a first image showing a signal strength per communication module.
Figure 33:
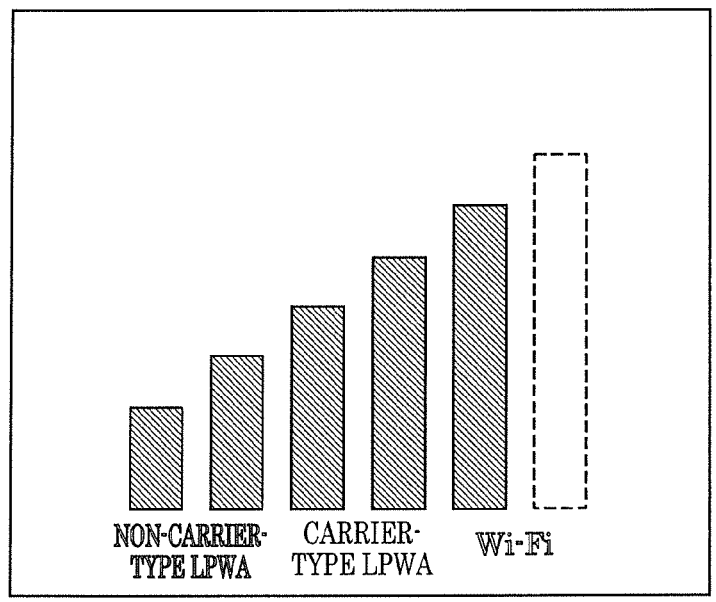
FIG. 33 is an explanatory diagram of a second image showing a signal strength per communication module.

A presentation method of a signal strength of device 10 including multiple communication methods will be described next. FIG. 32 and FIG. 33 are explanatory diagrams of respectively a first image and a second image showing the signal strength per communication module.

A technical problem is as follows. With smartphones, carrier-type signal strength and Wi-Fi signal strength are often displayed in parallel. When displaying carrier-type LPWA, non-carrier-type LPWA, and Wi-Fi signal strengths lined up next to one another on an IoT appliance as in FIG. 32, it is difficult for standard consumers to understand which communication speed to expect, when displaying each sign strength separately. For example, a reception of the non-carrier-type LPWA is exceedingly good in FIG. 32. Thus, from the point of view of a user that does not know the characteristics of each communication method, it is possible that the user may falsely make the assumption that high communication speed is possible, i.e., that all functionality of the IoT appliance can be used without problem, by using non-carrier-type LPWA.

In other words, to the user, the communication speed of the Wi-Fi ends up appearing the slowest and the communication speed of the non-carrier-type LPWA the fastest. In this manner, the user does not know whether communication speed is fast or not.

A solution to the technical problem is as follows. As illustrated in FIG. 33, the three methods are shown as one diagram not per communication method, but from the point of view of communication speed. In FIG. 33, six bars lined up next to one another make it possible to show an indication of the communication speed, and also implicitly show that communication speed is high when a Wi-Fi connection is set up and the IoT appliance can be used without problem, by having specific bars (e.g., first and second bars from the left are non-carrier LPWA) correlate to the three means of communication, and, for example, showing the means of communication whose communication speed is currently implemented with a dark color and showing the means of communication that are not being used as thinned out.

For example, when Wi-Fi is connected, signal strength is presented with the fifth and sixth bars from the left. The four left bars are colored in regardless of the connection status of the carrier-type LPWA and non-carrier-type LPWA.

When carrier-type LPWA is connected and Wi-Fi is not connected, signal strength is presented with the third and fourth bars from the left. The first and second bars are colored in regardless of the connection status of the non-carrier-type LPWA.

In a case in which only non-carrier-type LPWA is connected, signal strength is presented with the left two bars.

The name of the communication method currently being used for the communication is displayed in another configuration than the names of the other communication modules. For example, the name of the communication method currently being used for the communication is displayed in bold and the names of the other communication methods are displayed whited out. For example, the name of the communication method currently being used for the communication may be displayed with a comparatively dark color than the names of the other communication methods may be displayed with a comparatively light color. Note that the display method is not limited to the foregoing.

Through such a display method, it is possible to let the user know that switching to Wi-Fi will speed up response time, when the IoT appliance is connected through non-carrier-type LPWA or carrier-type LPWA and the user feels response time is slow when performing a type of operation.

Summary

Concerning an IoT appliance that is capable of providing a user of the appliance with various apps or services by being connected to a cloud, balancing communication speed and limiting communication fees has been described as being possible up until this point, by (i) equipping the IoT appliance with multiple communication methods (described as Wi-Fi, carrier-type LPWA, and non-carrier-type LPWA, but are not limited thereto) as a means of communication when connected to the cloud, and (ii) suitably switching between communication methods, taking in consideration the characteristics of each communication method (communication speed, delay time, cost required for communication, etc.), and the properties of data to be transmitted (size, urgency of data, time until data is transmitted, etc.).

The user using the IoT appliance equipped with multiple communication methods is capable of enjoying various apps or services without setting up a Wi-Fi connection, such as, controlling an air conditioner from outside of their home.

Note that another example of the configuration of device 10 and the communication method that device 10 executes will be described.

Figure 34:
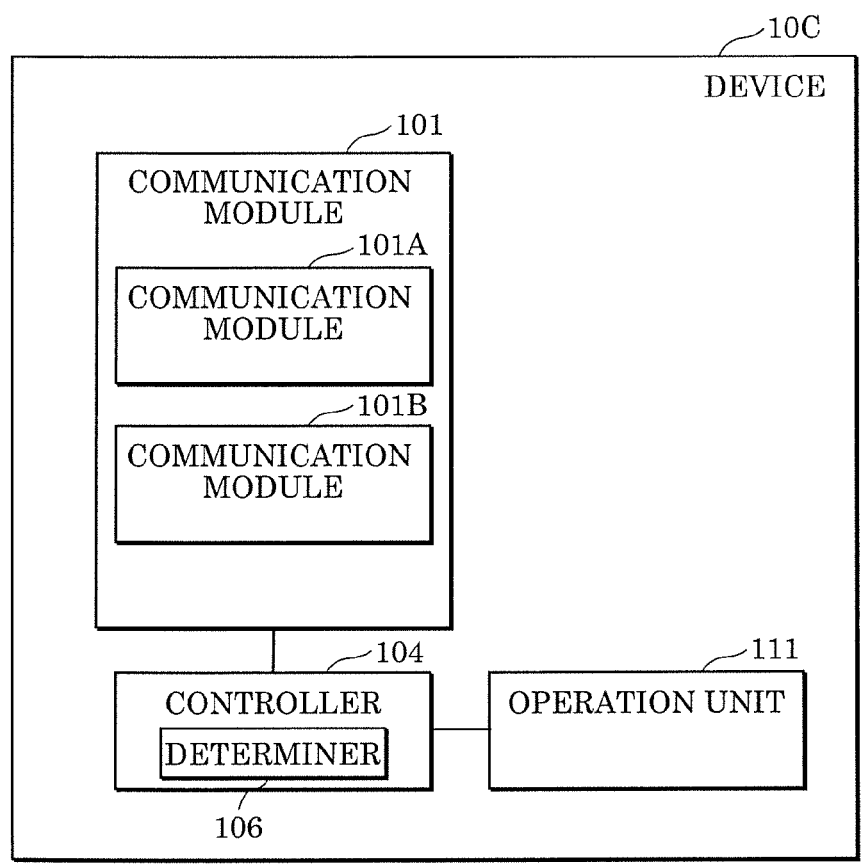
FIG. 34 is another configuration diagram showing blocks of a device.

FIG. 34 is a configuration diagram showing blocks of device 10C as another example of the configuration of device 10.

As illustrated in FIG. 34, device 10C includes multiple communication modules 101A and 101B, controller 104, determiner 106, and operation unit 111.

Communication module 101A is a short-distance communication module that is a communication module for short-distance wireless communication. Communication module 101B is a long-distance communication module that is a communication module for long-distance wireless communication. Device 10C is capable of being connected to a server managing device 10C through the plurality of communication modules 101A and 101B.

Operation unit 111 (corresponds to the receiver) is a processor for receiving information necessary to the short-distance wireless communication by the short-distance communication module, when the long-distance communication module and the short-distance communication module are not operating.

Determiner 106 determines whether the information received by operation unit 111 satisfies a condition indicating that the information is sufficient for a connection (corresponds to the first connection) to the server using the short-distance communication module.

Controller 104 is a processor that causes the long-distance communication module to start operating, when determiner 106 determines that the above information does not satisfy the above condition.

Figure 35:
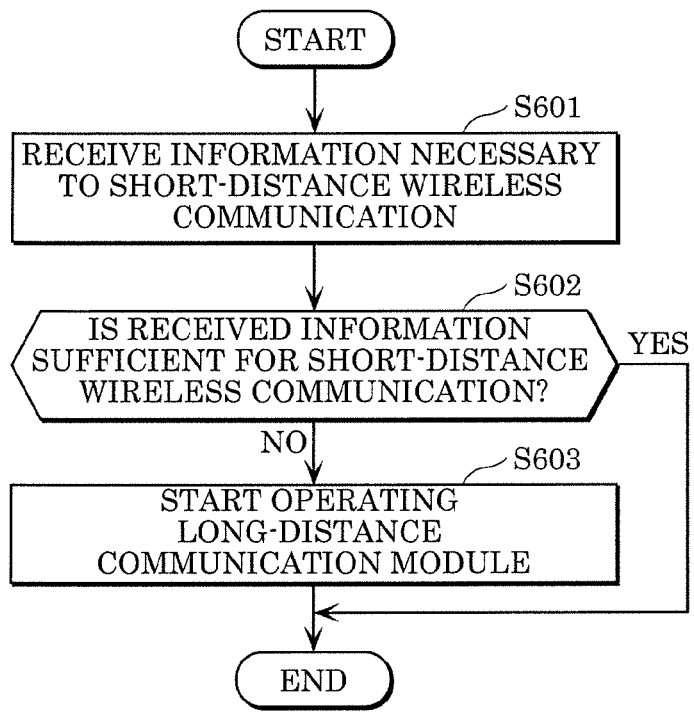
FIG. 35 is a flowchart showing a communication method that is executed by the device.

FIG. 35 is a flowchart showing a communication method that is executed by device 10C as another example of the communication executed by device 10.

Step S601 (receiving) is a process for receiving information necessary to the short-distance wireless communication by the short-distance communication module, when the long-distance communication module and the short-distance communication module are not operating.

Step S602 (determining) is a process during which it is determined whether the information received in the receiving satisfies a condition indicating that the information received in the receiving is sufficient for a first connection to the server using the short-distance communication module.

Step S603 (causing) is a process during which the long-distance communication module is caused to start operating, when it is determined in the determining that the above information does not satisfy the above condition.

This enables device 10C to be connected to the control cloud and controlled accordingly.

As stated above, the device according to the present embodiment is in a state in which it is possible to communicate with the server by causing the long-distance communication module to operate, when the user is not provided with the information necessary to the short-distance wireless communication. As such, the device not being connected to either the short-distance wireless communication and the long-distance wireless communication network is avoided, when a short-distance wireless communication connection is not established due to the device not being provided by the user with the information necessary to the short-distance wireless communication. As such, the device is capable of being connected to the control cloud and controlled accordingly.

The device is capable of prompting the user, through the image, to use the plurality of communication modules included in the device, after the long-distance communication module is caused to operate. It is conceivable that the user continues using the long-distance communication module only for the reason that the long-distance communication module has started operating, but it is possible that there is a communication module more suitable for usage of the device, regardless of whether the long-distance communication module is suitable for usage of the device. As such, by displaying the above image, it is possible to use a more suitable communication module for connecting to the server, to connect the device to the control cloud, and control the device accordingly.

The device is capable of using the plurality of communication modules included in the device and connecting to the server after the long-distance communication module has been caused to operate. In this manner, the device is capable of using a more suitable communication module for connecting to the server.

In a state in which the low-speed communication module is already connected, the device receives the information for the short-distance wireless communication, starts operating the long-distance communication module (high-speed communication module), and the like. In the communication by the low-speed communication module, services that the user can enjoy are limited, since communication traffic is restricted to a small amount. As such, along with initially being capable of receiving limited control from the low-speed communication module, the device is capable of being controlled at a higher level with fewer limitations, by subsequently causing the high-speed communication module or the short-distance communication module to start operating. In this manner, the device is capable of being connected to the control cloud and controlled accordingly.

The device is capable of communicating with the server through the low-speed communication module, when connection through neither the short-distance wireless communication nor the high-speed communication module is possible. This enables the device to be connected to the control cloud and controlled accordingly.

The device is capable of being connected to the server through the short-distance communication based on an operation performed by the user, when communication with the server using the high-speed communication module and the low-speed communication module is not possible. This enables the device to be connected to the control cloud and controlled accordingly.

The device is capable of being connected to the server through the long-distance communication module, using the information stored beforehand, without needing to be provided with new information. This enables the device to be connected to the control cloud and controlled accordingly.

As stated above, the embodiment is described as an example of the technique in the present disclosure. Accordingly, accompanying drawings and detailed description are provided.

Therefore, the components described in the accompanying drawings and the detailed description include, in addition to components essential to overcoming problems, components that are not essential to overcoming problems but are included in order to exemplify the techniques described above. Thus, those non-essential components should not be deemed essential due to the mere fact that they are illustrated in the accompanying drawings and described in the detailed description.

The above embodiment is for providing an example of the technique in the present disclosure, and thus various modifications, substitutions, additions, and omissions are possible in the scope of the claims and equivalent scopes thereof.

INDUSTRIAL APPLICABILITY

The present disclosure can be applied to a device capable of being connected to a control cloud and controlled accordingly. To be specific, the present disclosure can be applied to appliances such as a refrigerator, a washing machine, and an air conditioner.

The invention claimed is:

1. A control method for controlling a device, the control method comprising:
   receiving, using the device, information necessary for short-distance wireless communication by a short-distance communication module included in the device, when the long-distance communication module and the short-distance communication module are not operating, and includes Wi-Fi setting information,
   wherein the device includes a plurality of communication modules including a long-distance communication module configured for long-distance wireless communication and the short-distance communication module configured for short-distance wireless communication, the device being connected through each of the plurality of communication modules to a server that manages the device, and
   wherein the server is a cloud based server and is configured to manage the device by updating an operating software of the device and/or adding and updating functionality of the device by updating a control mechanism of the device;
   determining, using the device, whether the information received in the receiving satisfies a condition (i) indicating that the information received in the receiving is sufficient for a first connection to the server using the short-distance communication module, and (ii) that the information received in the receiving includes at least one of an extended service set identifier (ESSID) of Wi-Fi, a service set identifier (SSID) of Wi-Fi, a wireless channel of Wi-Fi, or an encryption key of Wi-Fi; and
   operating the long-distance communication module when the device determines that the information does not satisfy the condition.

2. The control method according to claim 1, further comprising:
   displaying an image on a display screen that prompts a user to use any of the plurality of communication modules as one communication module used for a connection between the device and the server, when a predetermined period has passed since causing the long-distance communication module to operate in the causing.

3. The control method according to claim 2, wherein
   in the causing, the one communication module is further caused to start operating or continue operating, upon receiving an instruction from the user after the displaying to use the one communication module.

4. The control method according to claim 1, wherein
   the plurality of communication modules further include a low-speed communication module that is a long-distance communication module having a lower communication speed than a high-speed communication module that is the long-distance communication module, and
   in the causing, when the receiving is performed, (a) the high-speed communication module among the long-distance communication modules is not caused to operate, (b) the low-speed communication module among the long-distance communication modules is further caused to operate (c) and a second connection is further established between the server and the device through the low-speed communication module.

5. The control method according to claim 4, wherein in the causing:
   it is determined whether a third connection is established to the server through the high-speed communication module, when the high-speed communication module is caused to start operating; and
   the high-speed communication module is caused to communicate with the server via the second connection, when it is determined that the third connection is not established.

6. The control method according to claim 5, wherein in the causing, an image is displayed on the display screen that prompts the user to use the short-distance communication module for the connection between the device and the server, when it is not possible to communicate with the server via the second connection.

7. The control method according to claim 1, wherein
   the device stores information necessary to the long-distance wireless communication by the long-distance communication module beforehand, and in the causing, the information stored beforehand is used, when causing the device to connect to the server through the long-distance wireless communication by the long-distance communication module.

8. A device, comprising:
a plurality of communication modules that include a long-distance communication module that is a communication module for long-distance wireless communication and a short-distance communication module that is a communication module for short-distance wireless communication, the plurality of communication modules each being capable of connecting the device to a server that manages the device,
- wherein the device includes a plurality of communication modules including a long-distance communication module configured for long-distance wireless communication and the short-distance communication module configured for short-distance wireless communication, the device being connected through each of the plurality of communication modules to a server that manages the device, and
- wherein the server is a cloud based server and is configured to manage the device by updating an operating software of the device and/or adding and updating functionality of the device by updating a control mechanism of the device;
- a receiver for receiving information which is necessary to the short-distance wireless communication by the short-distance communication module, when the long-distance communication module and the short-distance communication module are not operating, and includes Wi-Fi setting information;
- a determiner that determines whether the information received by the receiver satisfies a condition (i) indicating that the information received in the receiving is sufficient for a first connection to the server using the short-distance communication module, and (ii) that the information received in the receiving includes at least one of an extended service set identifier (ESSID) of Wi-Fi, a service set identifier (SSID) of Wi-Fi, a wireless channel of Wi-Fi, or an encryption key of Wi-Fi; and
- a controller that causes the long-distance communication module to start operating, when the determiner determines that the information does not satisfy the condition.

9. A system, comprising:
the device according to claim 8; and
the server that is capable of being connected to the device through each of the plurality of communication modules.

* * * * *